(12) United States Patent
Hagano et al.

(10) Patent No.: US 11,597,269 B2
(45) Date of Patent: Mar. 7, 2023

(54) FUEL DEVICE

(71) Applicant: TOYODA GOSEI CO., LTD., Kiyosu (JP)

(72) Inventors: Hiroyuki Hagano, Kiyosu (JP); Norihiko Ishihara, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 244 days.

(21) Appl. No.: 17/095,273

(22) Filed: Nov. 11, 2020

(65) Prior Publication Data

US 2021/0138898 A1   May 13, 2021

(30) Foreign Application Priority Data

Nov. 13, 2019 (JP) .............................. JP2019-205118
Nov. 13, 2019 (JP) .............................. JP2019-205119
Nov. 13, 2019 (JP) .............................. JP2019-205120

(51) Int. Cl.
*B60K 15/04* (2006.01)

(52) U.S. Cl.
CPC ...... *B60K 15/04* (2013.01); *B60K 2015/0458* (2013.01)

(58) Field of Classification Search
CPC .................... B60K 15/04; B60K 2015/0458
USPC ....................................................... 220/86.2
See application file for complete search history.

(56) References Cited

U.S. PATENT DOCUMENTS

| | | | |
|---|---|---|---|
| 6,302,169 B1 * | 10/2001 | Pulos ..................... | B60K 15/04 141/301 |
| 6,968,874 B1 | 11/2005 | Gabbey et al. | |
| 7,293,586 B2 * | 11/2007 | Groom .................. | B60K 15/04 141/367 |
| 8,714,214 B2 | 5/2014 | Cisternino | |

(Continued)

FOREIGN PATENT DOCUMENTS

| | | |
|---|---|---|
| JP | 2008-535678 A | 9/2008 |
| JP | 2009-502611 A | 1/2009 |

(Continued)

OTHER PUBLICATIONS

Notice of Reasons for Refusal dated Jul. 26, 2022 issued in corresponding JP Patent Application No. 2019-205118 (and English translation).

*Primary Examiner* — J. Gregory Pickett
*Assistant Examiner* — Niki M Eloshway
(74) *Attorney, Agent, or Firm* — Posz Law Group, PLC

(57) ABSTRACT

A fuel device FS includes a discriminating portion 50, an operation member, an abutting member 57 and an open/close member 70. The discriminating portion 50 includes an discrimination opening GL formed of a first portion and a second portion. The first portion is an opening corresponding to an external diameter of a small-diameter nozzle FNS. The second portion is an opening having a shape corresponding to an external diameter of a large-diameter nozzle FNL compatible with the fuel device. The operation member 51 of the discriminating portion 50 guides the small-diameter nozzle intended to insert into the second portion to be inserted into the first portion. The abutting member 57 prevents a tip of the small-diameter nozzle from passing the first portion. The open/close member 70 is caused to enter an open state by the large-diameter nozzle passing through the second portion of the discrimination opening GL.

17 Claims, 33 Drawing Sheets

(56) References Cited

U.S. PATENT DOCUMENTS

| | | | | |
|---|---|---|---|---|
| 8,763,656 B2* | 7/2014 | Ichimaru | ............ | B60K 15/04 |
| | | | | 220/86.2 |
| 8,910,687 B2* | 12/2014 | Izvozchikov | ......... | G01N 1/312 |
| | | | | 156/521 |
| 9,481,239 B2 | 11/2016 | Ryu et al. | | |
| 2007/0034287 A1* | 2/2007 | Groom | ............ | B60K 15/04 |
| | | | | 220/86.2 |
| 2009/0056831 A1 | 3/2009 | Journee | | |
| 2009/0236044 A1 | 9/2009 | Gallana Blanco et al. | | |
| 2010/0006178 A1 | 1/2010 | Muth et al. | | |
| 2012/0279612 A1 | 11/2012 | Washio et al. | | |
| 2014/0284329 A1* | 9/2014 | Frank | ............ | B60K 15/03006 |
| | | | | 220/86.2 |
| 2014/0352846 A1* | 12/2014 | Ryu | ............ | B60K 15/04 |
| | | | | 220/86.2 |
| 2015/0102031 A1 | 4/2015 | Yoshida et al. | | |
| 2015/0298542 A1* | 10/2015 | Kim | ............ | B60K 15/04 |
| | | | | 220/86.2 |
| 2016/0152133 A1* | 6/2016 | Hendler | ............ | B60K 15/04 |
| | | | | 220/86.2 |

FOREIGN PATENT DOCUMENTS

| | | |
|---|---|---|
| JP | 2009-530149 A | 8/2009 |
| JP | 2015-063294 A | 4/2015 |
| JP | 2015-74409 A | 4/2015 |
| WO | 2011/062193 A1 | 5/2011 |

* cited by examiner

V-ARROW VIEW

VIIB-VIIB CROSS-SECTIONAL VIEW

VIIIB-VIIIB CROSS-SECTIONAL VIEW

XXI-XXI CROSS-SECTIONAL VIEW

//FUEL DEVICE

CROSS-REFERENCE TO RELATED APPLICATION

The present application claims priority from Japanese applications P2019-205118 filed on Nov. 13, 2019, P2019-205119 filed on Nov. 13, 2019, and P2019-205120 filed on Nov. 13, 2019 the content of which is hereby incorporated by reference into this application.

BACKGROUND

1. Field

The present disclosure relates to a fuel device configured to receive a fuel nozzle used for supplying fuel to a fuel tank.

2. Related Art

At a fuel supply facility provided for supplying an automobile with fuel, the external diameters of fuel nozzles at the fuel supply facility are made different to each other such that unintended fuel is not erroneously supplied to an automobile when supplying fuel. In recent years, AdBlue (aqueous urea solution) has been supplied as a catalyst for diesel vehicles, and nozzles for supplying this solution are also made with different diameters. Specifically, in Japan, a gasoline nozzle diameter is approximately 21.0 mm and a diesel nozzle diameter is 23.5 mm. The diameters of these nozzles differ from country to country and nozzle diameters are often differentiated for each type of fluid expected to be supplied to an automobile. In some countries, nozzle diameters in a fuel supply facility are made different for different types of fuel, and fuel devices in automobiles are required by law to be provided with a mechanism that prevents a different type of fuel from being supplied. The technologies disclosed in the specification of U.S. Pat. No. 8,714,214 and JP 2015-74409 are known examples of a device that determines whether fuel supply is possible based on the difference in nozzle diameter.

SUMMARY

As described above, the size of nozzle diameters differs from country to country, and in some cases this difference is only 1 mm. In Japan, for example, the diameter of an AdBlue nozzle is 19 mm, and is 2 mm different from the diameter of a gasoline nozzle. There is a demand to develop a device that can accurately discern such a slight difference to minimize incorrect nozzle insertion.

The present disclosure can be implemented in the form of the following aspects and application examples.

One embodiment of the present disclosure provides a fuel device configured to accept a fuel nozzle when an action of supplying fuel is performed. 1. A fuel device configured to accept a fuel nozzle, the fuel device comprising: a fuel supply port forming portion including a fuel supply port configured to accept a fuel nozzle and forming a portion of a fuel passage from the fuel supply port to a fuel tank; a discriminating portion provided in a region in which the fuel nozzle inserted from the fuel supply port reaches, the discriminating portion configuring an discrimination opening formed of a first portion and a second portion, the first portion being an opening corresponding to an external diameter of a small-diameter nozzle having an external diameter smaller than a fuel nozzle compatible with the fuel device, and the second portion being an discrimination opening having a shape corresponding to an external diameter of a large-diameter nozzle compatible with the fuel device; an operation member provided in the discriminating portion and configured to guide the small-diameter nozzle intended to insert into the second portion to be inserted into the first portion; an abutting member provided closer to the fuel tank than the discrimination opening of the discriminating portion, the abutting member preventing a tip of the small-diameter nozzle from passing the first portion; and an open/close member provided closer to the fuel tank than the discriminating portion, the open/close member being biased from the fuel tank toward a close direction and caused to enter an open state by the large-diameter nozzle passing through the second portion of the discrimination opening. In case of the small-diameter nozzle having an external diameter not compatible with the fuel device is inserted from the discrimination opening, the fuel device uses an operation member provided in the discriminating portion configuring the discrimination opening formed of the first portion and the second portion to guide the small-diameter nozzle to the first portion and uses the abutting portion to prevent the small-diameter nozzle from proceeding. Thus, it is possible to minimize the occurrence of a small-diameter nozzle that is not compatible with the fuel device from being erroneously inserted.

(2) The above-described fuel device may include a guide member formed at a predetermined height close to the fuel supply port at a position at which the first portion and the second portion of the discriminating portion are connected, and an operation member configured to prevent passage of the small-diameter nozzle through the discrimination opening by guiding the small-diameter nozzle to the first portion, the small-diameter nozzle being inserted into the discrimination opening. Here, the guide member may include a first guide inclined face inclined toward the first portion closer to the fuel supply port. In the fuel device, when a fuel nozzle is inserted from the fuel supply port, the small-diameter nozzle having an external diameter not compatible with the fuel device may be guided to the first portion of the discrimination opening by the first guide inclined face of the guide member. When the small-diameter nozzle is inserted into the second portion, the operation member guides the small-diameter nozzle to the first portion to prevent the small-diameter nozzle from proceeding. Thus, it is possible to minimize the occurrence of a small-diameter nozzle that is not compatible with the fuel device from being erroneously inserted.

(3) The above-described fuel device may further include a guide member formed at a predetermined height close to the fuel supply port at a position at which the first portion and the second portion of the discriminating portion are connected, and an operation member configured to prevent passage of the small-diameter nozzle through the discrimination opening by guiding the small-diameter nozzle to the first portion, the small-diameter nozzle being inserted into the discrimination opening, wherein a side of the guide member close to the fuel supply port includes a second guide inclined face inclined toward the second portion while reducing in diameter, and a side of the guide member opposite to the fuel supply port is formed into a shape forming a space in a predetermined region from an inner peripheral edge of the discrimination opening outward. In this fuel device, when a fuel nozzle is inserted from the fuel supply port, a large-diameter nozzle having an external diameter compatible with the fuel device is easily guided to the second portion of the discrimination opening by the second guide inclined face of the guide member. On the other hand, when the small-diameter nozzle is inserted into the second portion, the operation member guides the small-diameter nozzle to the first portion and prevents the small-diameter nozzle from proceeding. In addition, even when the small-diameter nozzle abuts against a portion of the second guide inclined face of the guide member and the operation member is made to operate in the same way as when the large-diameter nozzle is inserted, the side of the guide member opposite to the fuel supply port forms a shape forming a space in a predetermined region from an inner peripheral edge of the discrimination opening outward. Thus, if the small-diameter nozzle passes through the end point of the second guide inclined face, the tip of the small-diameter nozzle cannot make contact with the guide member as the large-diameter nozzle and the operation member guides the small-diameter nozzle to the first portion to prevent the small-diameter nozzle from proceeding. Thus, it is possible to minimize the occurrence of a small-diameter nozzle that is not compatible with the fuel device from being erroneously inserted.

DESCRIPTION OF THE PREFERRED EMBODIMENTS

A. First Embodiment

Figure 1:
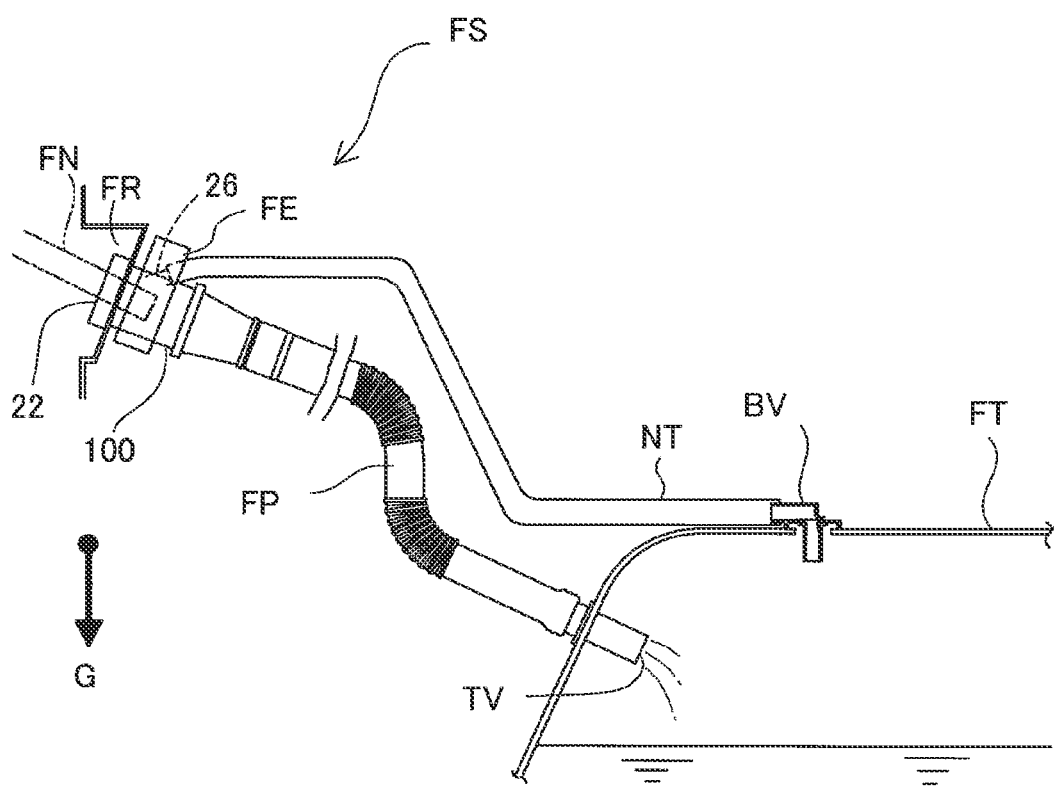
FIG. 1 is a schematic configuration diagram illustrating an overall configuration of a fuel device according to an embodiment.

FIG. 1 is an explanatory diagram illustrating an overview of a fuel device FS according to a first embodiment. The fuel device FS is mounted to a vehicle and guides fuel supplied from a fuel nozzle FN to a fuel tank FT. In FIG. 1, a vertical direction is indicated by an arrow G. The fuel device FS includes a filler neck 100 as a fuel supply port forming member, a fuel vapor port 26, a filler pipe FP, a check valve TV, a fuel vapor tube NT, a gas release valve BV, and a mounting member FE. The filler neck 100 is mounted to a fuel supply chamber FR of the vehicle by using the mounting member FE and accepts insertion of the fuel nozzle FN into a fuel supply port 22. Alternatively, in place of the illustrated mounting member FE, the filler neck 100 may be mounted to the fuel supply chamber FR by using circular base plate formed with a circular hole at the center through which a portion of the filler neck 100 is inserted.

The filler neck 100 is connected to the fuel tank FT, the filler pipe FP, and the fuel vapor tube NT. The filler neck 100 guides liquid fuel such as gasoline from the fuel nozzle FN (see FIG. 1) inserted into the fuel supply port 22 to the fuel tank FT connected to the filler neck 100 via the filler pipe FP. The filler pipe FP is, for example, a resin tube having a bellowed structure at two portions that expands and contracts and can bend within a certain range. The filler pipe FP is connected to the fuel tank FT via the check valve TV. Fuel that has been discharged from the fuel nozzle FN inserted into the fuel supply port 22 passes through a fuel passage (described later) formed by the filler neck 100 and the filler pipe FP to be guided to the fuel tank FT from the check valve TV. The check valve TV prevents the fuel from flowing back to the filler pipe FP from the fuel tank FT.

The fuel vapor tube NT has an end connected to the fuel tank FT via a gas release valve BV and another end connected to the fuel vapor port 26, which protrudes outward from the filler neck 100. The gas release valve BV also functions as a joint that connects the fuel vapor tube NT to the fuel tank FT. In-tank air containing fuel vapor flows from the gas release valve BV to the fuel vapor tube NT. When fuel is supplied from the fuel nozzle FN, this fuel vapor flows through the filler pipe FP together with the supplied fuel to reach the fuel tank FT. Now, the filler neck 100 will be described in detail.

Figure 2:
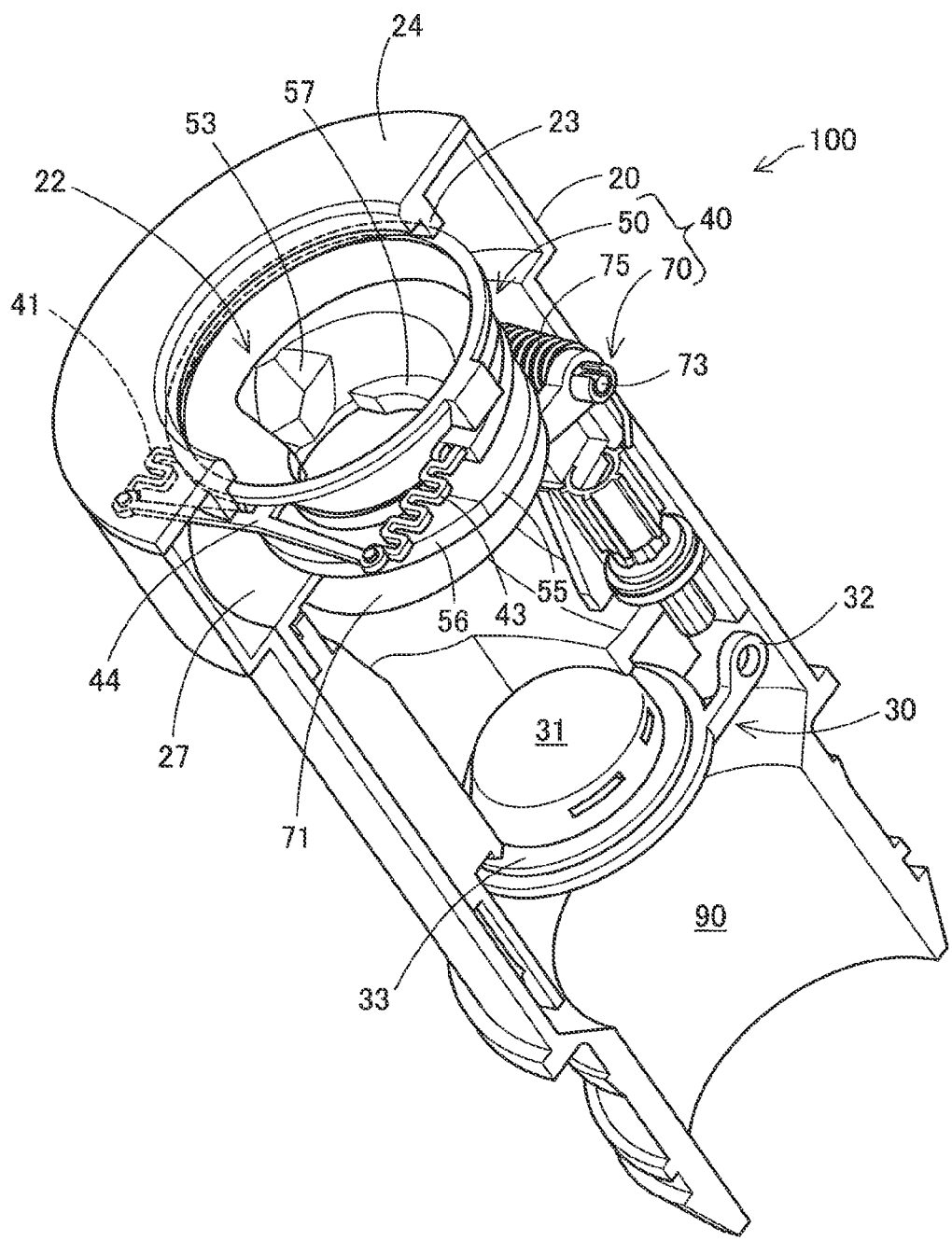
FIG. 2 is a partial broken-line perspective view illustrating an internal structure of a filler neck according to a first embodiment.

FIG. 2 is a partial broken-line perspective view illustrating an internal structure of a filler neck 100. In FIG. 2, a front side of a fuel passage forming portion 20 is illustrated as a cross-section. The fuel passage forming portion 20 is a member that forms the external shape of the entire filler neck 100 and forms a fuel passage 90 therein. The filler neck 100 includes, from a cover member 24 side forming the fuel supply port 22, a first open/close mechanism 40 and a second open/close mechanism 30. The first open/close mechanism 40 and the second open/close mechanism 30 are both located in a range that reaches the fuel nozzle FN and are opened by inserting a fuel nozzle FN that is compatible with the fuel device FS.

As illustrated, the second open/close mechanism 30 is disposed on a lower portion of the fuel passage forming portion 20 closest to the fuel tank and is configured to opens/close the fuel passage 90. The second open/close mechanism 30 includes a second open/close valve 31 configured to open/close the fuel passage 90, and a spring (not shown) that is fixed to the fuel passage forming portion 20 and biases the second open/close valve 31. The second open/close valve 31 is a flap that prevents liquid fuel from flowing back to the insertion side from the fuel tank side and includes a sealing member 33 used for sealing. The second open/close valve 31 is rotatably supported by a rotation shaft 32 provided in the fuel passage forming portion 20 and uses the spring to bias the second open/close valve 31 in a direction in which the fuel passage 90 closes.

The first open/close mechanism 40 is provided closer to the fuel supply port 22 than the second open/close mechanism 30 and includes the discriminating portion 50 configured to discriminate between external diameters of inserted fuel nozzles FN, and an open/close member 70 disposed closer to the fuel tank FT than the discriminating portion 50. In the present embodiment, the discriminating portion 50 is formed entirely of resin. The configuration of the discriminating portion 50 will be described with reference to FIG. 3 to FIG. 6. The discriminating portion 50 is formed with a circular entrance through which a fuel nozzle compatible with the fuel device FS can proceed, and includes a tapered conical guard 51 provided on an inner side of the discriminating portion 50 and the moving member 52, which is movably incorporated into the conical guard 51 at a lower portion of the conical guard 51. The conical guard 51 includes an upper edge portion 59 on an upper outer external periphery of the conical guard 51, and a fixing flange portion 56 provided on half of a lower outer external periphery of the conical guard 51. As illustrated in FIG. 2, the upper edge portion 59 is fixed to a return portion 23 formed on an inner side of the fuel supply nozzle 22 of the cover member 24. Thus, when the fuel nozzle FN is inserted, the conical guard 51 does not move even when the tip of the fuel nozzle FN abuts against the conical guard 51.

The conical guard 51 is formed into a tapered shape that becomes smaller closer toward an inner side of the conical guard 51 in a radial direction, and no tapered portion exists where the moving member 52 is disposed. In other words, the lower half of the conical guard 51 has a shape excluding the position where the moving member 52 is disposed. A lower edge of the conical guard 51 is located on a side opposite to the fuel supply port 22. The fixing flange portion 56 extends outward from a tip of the tapered portion by a predetermined length to form a flanged shape.

Figure 4:
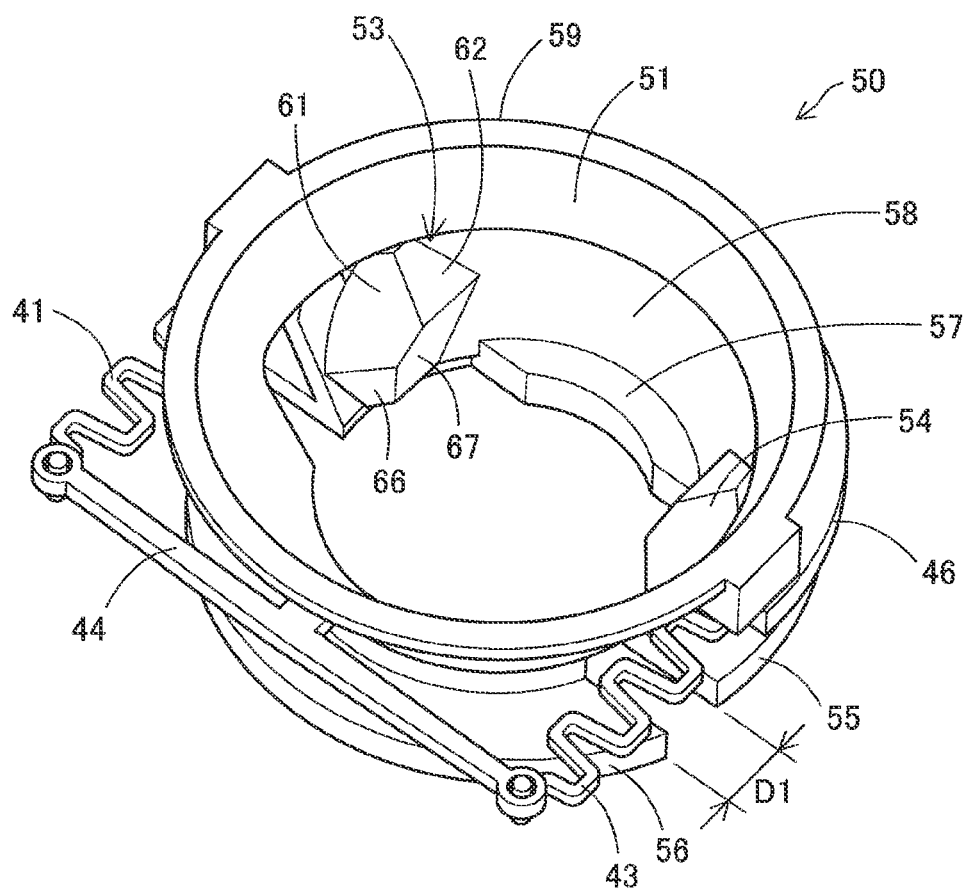
FIG. 4 is a perspective view illustrating the form of the discriminating portion in an operating state.
Figure 5:
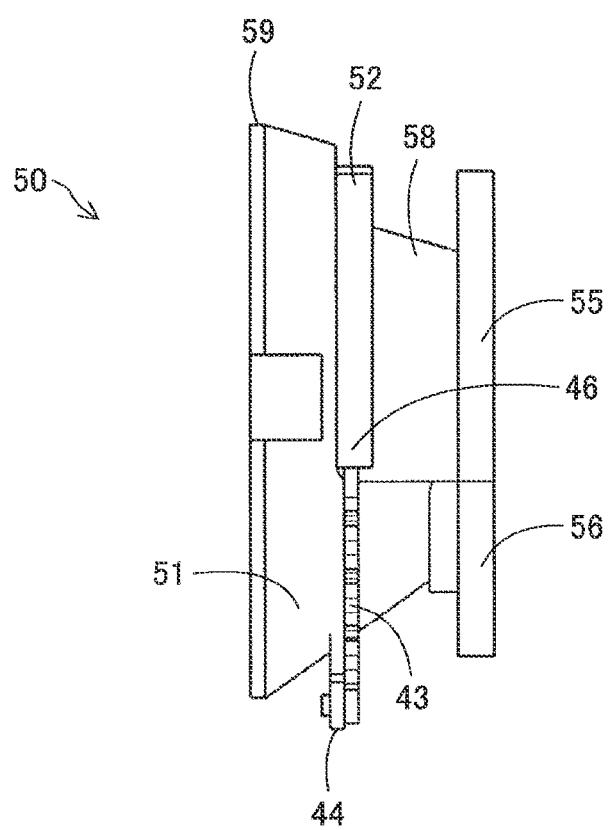
FIG. 5 is a V-arrow view illustrating a side face of the discriminating portion.
Figure 6:
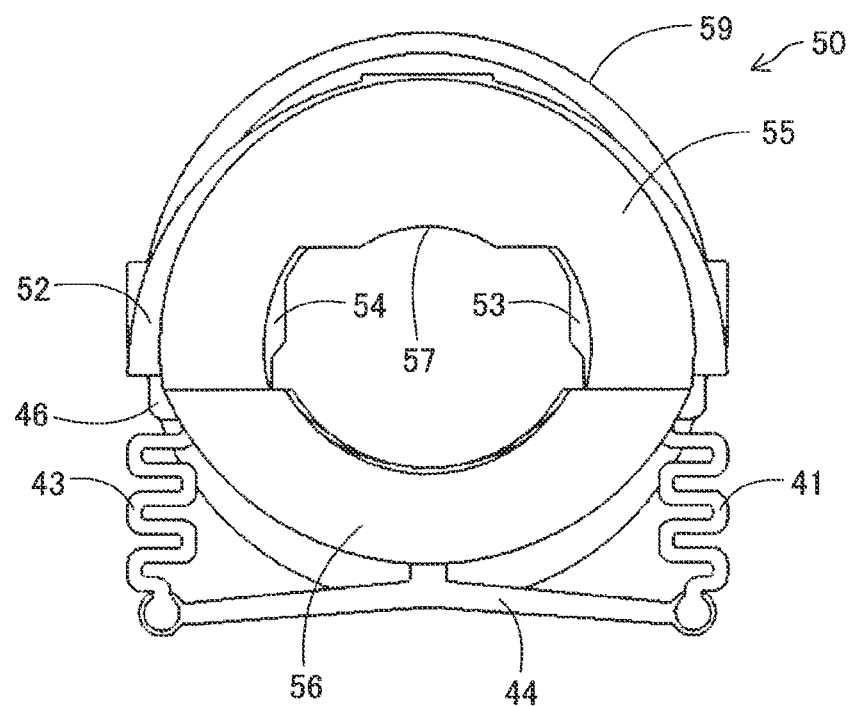
FIG. 6 is a rear view of the discriminating portion.

As illustrated in FIG. 5, the base of a supporting member 44 that supports spring members 41, 43 is fixed at about the center of the tapered portion of on the outer side of the conical guard 51. The supporting member 44 is formed into a substantial T-shape, extends outward from a position at which the supporting member 44 is fixed to the conical guard 51, and the resin spring members 41, 43 are attached to tip of arm portions of the supporting member 44 extending on both sides. Tips on sides opposite to the spring members 41, 43 are fixed to end portions 46 of the moving member 52. Thus, the moving member 52 is able to move in the illustrated direction DI within the range in which the spring members 41, 43 extend. FIG. 4 illustrates a state where the moving member 52 has moved. Note that the spring members 41, 43 can also be achieved by using a metal coil spring or a leaf spring.

On an inner side of the moving member 52, there is provided a tapered inclined portion 58 from an upper edge of the moving member 52 to a lower portion of the moving member 52, guide members 53, 54 disposed on either circumferential edge of the inclined portion 58, and an abutting portion 57 that protrudes inward from a lower edge of the inclined portion 58. An outer side of the moving member 52 is provided with a semicircular moving flange portion 55 that protrudes outward at a lower edge of the inclined portion 58.

As illustrated in FIG. 2, lower sides of the fixed flange portion 56 and the moving flange portion 55 are in contact with an upper face of the supporting member 27 formed on an inner side of the fuel passage forming portion 20. Thus, an upper edge of the discriminating portion 50 is fixed to the return portion 23 of the cover member 24, a lower edge of the discriminating portion 50 is in contact with the supporting member 27, and the moving member 52 is held between the return portion 23 and the supporting member 27 such that the moving member 52 moves on the surface of the supporting member 27. As illustrated in FIG. 4, in a state where the moving member 52 has moved in the direction of the arrow DI, the fixed flange portion 56 and the moving flange portion 55 enter a state separated from each other by the distance DI. This distance DI is the radial width of the abutting portion 57, that is, is longer than the length of the moving member 52 in the movement direction of the moving member 52.

Figure 3:
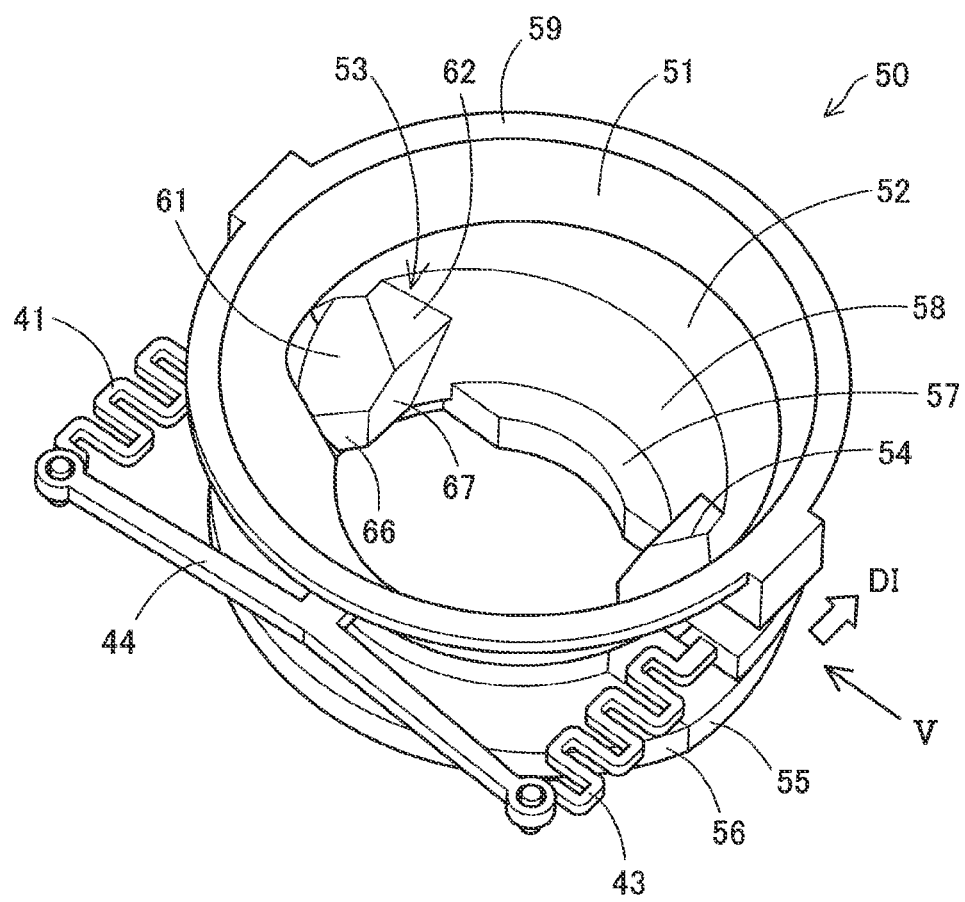
FIG. 3 is a perspective view illustrating the default form of a discriminating portion.

As illustrated in FIGS. 3 and 4, the guide members 53, 54 disposed at two locations on the inner side of the moving member 52 each have a trigone shape in which the upper half of each guide member 53, 54, that is, the fuel supply port 22 becomes narrower further upward, and a trigone shape in which the lower half of each guide member 53, 54, that is, the side opposite to the fuel supply port 22 becomes narrower further downward. The upper half of the guide member 53 includes two inclined faces 61, 62 that are each inclined radially inward and downward from the fuel supply port 22 side. Hereinafter, the inclined face 62 will be referred to as a first guide incline face 62, and the inclined face 61 will be referred to as a second guide incline face 61. The lower half of the guide member 53 is formed into a shape that recedes outward from ends of the first and second guide inclined faces 62, 61. A lower inclined face of the first guide inclined face 62 will be referred to as a first expanded lower face 67, and a lower inclined face of the second guide inclined face 61 will be referred to as a second expanded lower face 66. Although the entire shape on the guide member 54 side is not illustrated in FIGS. 3 and 4, the guide member 53 and the guide member 54 form a mirror-image shape and are disposed facing each other on either end of the inclined portion 58 of the moving member 52. A detailed description of the shape and operation of the guide members 53, 54 will be given below in sequence with reference to FIG. 7A and subsequent figures.

Figure 7A:
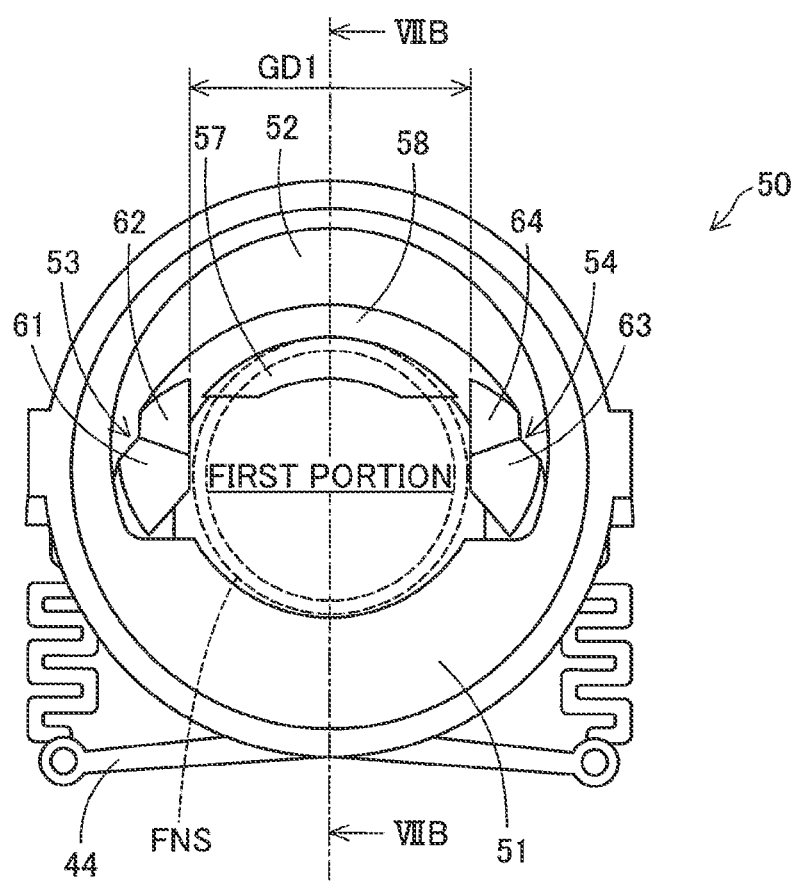
FIG. 7A is an explanatory diagram illustrating an operating state when a small-diameter nozzle is inserted.

As illustrated in FIG. 7A, for the guide members 53, 54, inner dimensional positions formed by a right end (radial inner end portion) of the guide member 53 and a left end (radial inner end portion) of the guide member 54 are separated from each other by an interval GD1. This interval GD1 is slightly larger than an external diameter of a small-diameter nozzle FNS, and slightly larger than an external diameter of a large-diameter nozzle FNL, which will be described later. In FIG. 7A, a fuel nozzle with a small diameter is illustrated with a broken line for reference. As described above, the upper half of the guide member 53 is provided with the first guide inclined face 62 and the second guide inclined face 61, which are inclined faces inclined in different directions. The upper half of the guide member 54 is formed with a first guide inclined face 64 and a second guide inclined face 63, which are inclined faces inclined in different directions. The first guide inclined faces 62, 64 of the guide members 53, 54 are oriented toward the center of the guide members 53, 54 and the second guide inclined faces 61, 63 of the guide members 53, 54 are oriented toward a side opposite the movement direction of the moving member 52.

Figure 7B:
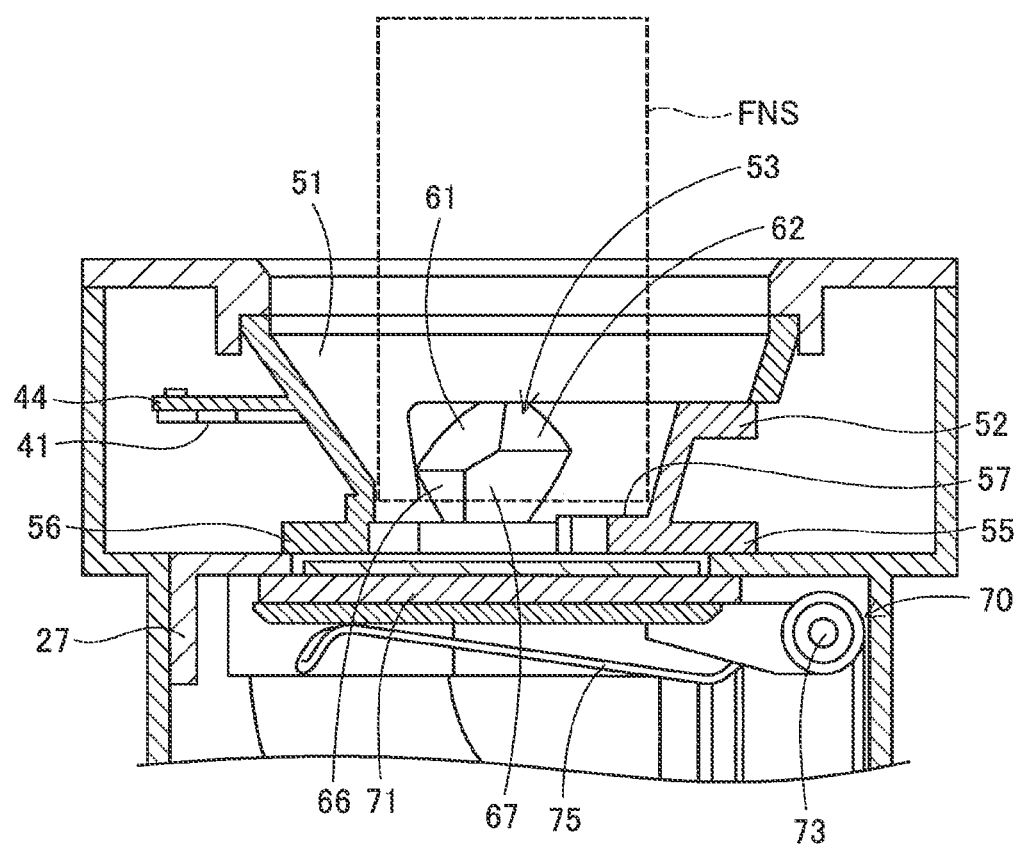
FIG. 7B is a cross-sectional view taken along the line VIIB-VIIB in FIG. 7A.

As illustrated in FIG. 7B, the abutting portion 57 of the moving member 52 is formed on a lower edge of the inclined portion 58 and also formed lower than lower ends of the second guide inclined faces 61, 63. As illustrated in FIG. 7A, a position at which the inclined portion 58 and the abutting portion 57 are in contact forms an arc shape. A lower end of the conical guard 51 has an arc shape with a diameter smaller than the upper end portion 59. In a state where the moving member 52 is not moving, that is, in a state where the fixed flange portion 56 and the moving flange portion 55 are in contact, a substantially circular portion formed by the abutting portion 57, the guide members 53, 54 and a lower end of the conical guard 51 is referred to as a first portion of the discriminating portion 50. This first portion is designed so as to house a fuel nozzle with a diameter smaller than the fuel nozzle FN, which is compatible with the fuel device FS. In the following description, a small-diameter fuel nozzle (a fuel nozzle with a diameter of 19.0 mm) that is not compatible with the fuel device FS will be referred to as the small-diameter nozzle FNS, and a large-diameter fuel nozzle (a fuel nozzle with a diameter of 20.5 mm) that is compatible with the fuel device FS will be referred to as the large-diameter nozzle FNL. In the present embodiment, the interval GD1 is 19.75 mm.

As illustrated in FIG. 7A, the small-diameter nozzle FNS is housed in the first portion of the discriminating portion 50 when the small-diameter nozzle FNS is at a position at which the moving member 52 is not moving (hereinafter, also referred to as a default position). Even if the insertion position of the small-diameter nozzle FNS slightly deviates with respect to the first portion, the first guide inclined faces 62, 64 of the guide members 53, 54 guide the small-diameter nozzle FNS to the first portion. In this state, as illustrated in FIG. 7B, which is a cross-sectional view taken along the line VIIB-VIIB in FIG. 7A, a tip of the small-diameter nozzle FNS abuts against the abutting portion 57 of the moving member 52 in the default position, and the small-diameter nozzle FNS is unable to proceed any further into the fuel passage 90. At a lower portion of the discriminating portion 50, that is, on the fuel tank FT side, the open/close member 70 disposed adjacent to the discriminating portion 50 includes a valve body 71 configured to cover the first portion in FIG. 7A, a holding shaft 73 configured to hold the valve body 71 rotatably in the fuel passage forming portion 20, and a spring 75. The spring 75 has one end fixed to the holding shaft 73 and another end disposed in contact with a lower face of the valve body 71. The valve body 71 is biased by the spring 75 in a covering direction. Because of this, provided that no external force acts on the valve body 71, the valve body 71 is held at a position covering the fuel passage 90. In a case where the small-diameter nozzle FNS is inserted into the fuel device FS and the tip of the small-diameter nozzle FNS is inserted into the first portion without being in contact with the conical guard 51, the inclined portion 58 of the moving member 52 and other components, the tip of the small-diameter nozzle FNS abuts against the abutting portion 57 and cannot proceed any further, and hence the valve body 71 of the open/close member 70 is not moved in an open direction.

Figure 8A:
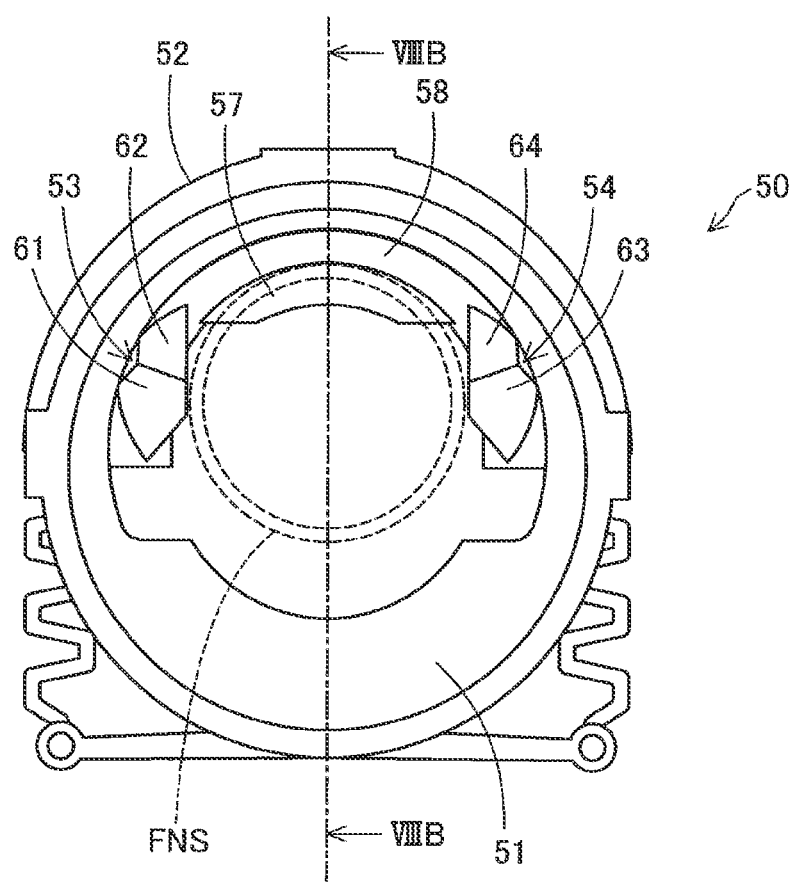
FIG. 8A is an explanatory diagram illustrating an operating state when a small-diameter nozzle is inserted into a first portion and an operation member is made to move.
Figure 8B:
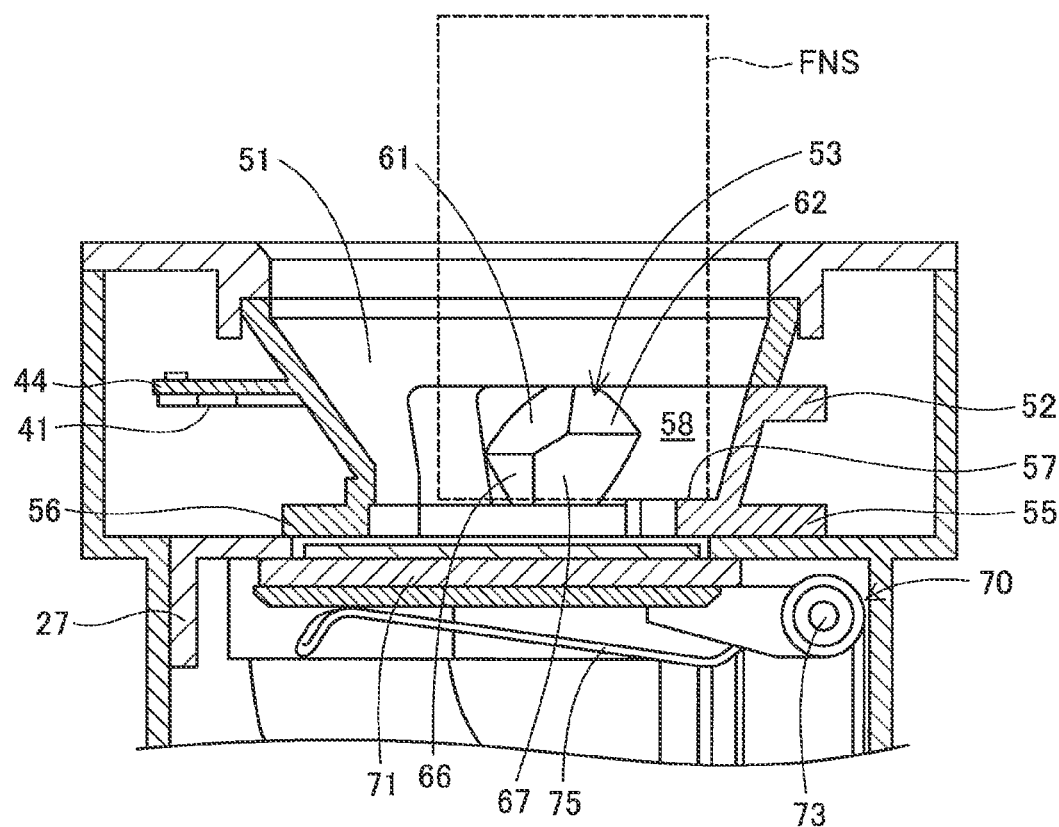
FIG. 8B is a cross-sectional view taken along the line VIIIB-VIIIB in FIG. 8A.

A case where the small-diameter nozzle FNS is forcibly pushed from the state illustrated in FIGS. 7A and 7B in the movable direction DI of the moving member 52 is illustrated in FIG. 8B, which is a cross-sectional view taken along the line VIIIB-VIIIB in FIG. 8A. When the small-diameter nozzle FNS pushes the moving member 52 outward in a radial direction, the spring members 41, 43 extend and the moving member 52 moves outward in the radial direction. Thus, the movement of the moving member 52 causes abutting portion 57 provided on the lower end of the moving member 52 to also move and, as illustrated in FIGS. 8A and 8B, the tip of the small-diameter nozzle FNS is prevented from proceeding by the abutting portion 57 of the moving member 52 and does not reach a position at which the valve body 71 of the open/close member 70 opens.

Figure 9A:
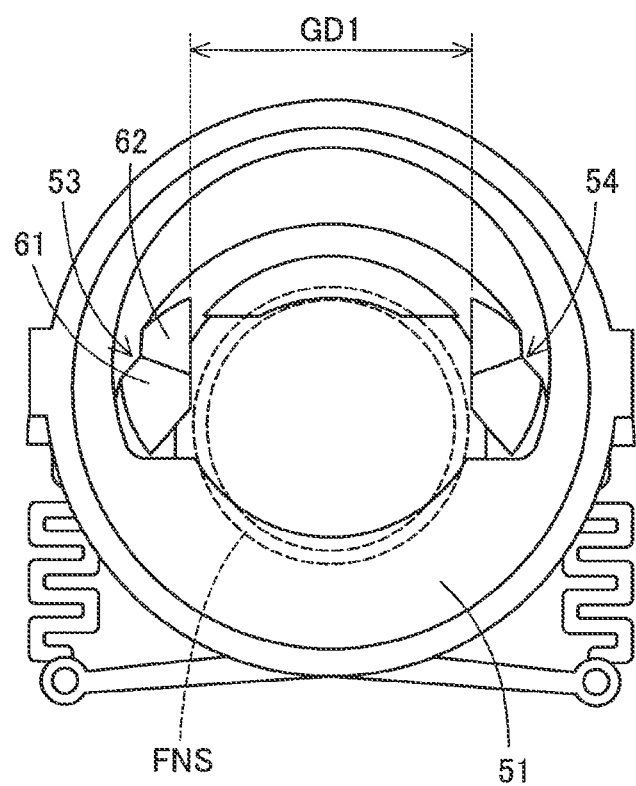
FIG. 9A is an explanatory diagram illustrating a state where the small-diameter nozzle is inserted into a second portion.

In a case where the small-diameter nozzle FNS is pushed from the state illustrated in FIGS. 7A and 7B toward a side opposite to the moving member 52, the conical guard 51, which is fixed and does not move, does not allow movement of the small-diameter nozzle FNS. While the tip of the small-diameter nozzle FNS abuts against the inclined portion of the conical guard 51, even if the guide members 53, 54 of the moving member 52 are simultaneously pushed to attempt to move the moving member 52, because the interval GD1 between the guide members 53, 54 is slightly larger than the external diameter of the small-diameter nozzle FNS as illustrated in FIG. 9A, one end of the small-diameter nozzle FNS abuts against the inclined portion of the conical guard 51 and the second guide inclined faces 61, 63 of the guide members 53, 54 cannot be simultaneously pushed on a side opposite the tip of the small-diameter nozzle FNS. Thus, when the small-diameter nozzle FNS is pushed further in this state, the small-diameter nozzle FNS moves toward the moving member 52 along the inclined portion of the conical guard 51 and finally enters the state illustrated in FIGS. 7A and 7B, where the small-diameter nozzle FNS is prevented from proceeding by the abutting portion 57.

Figure 9B:
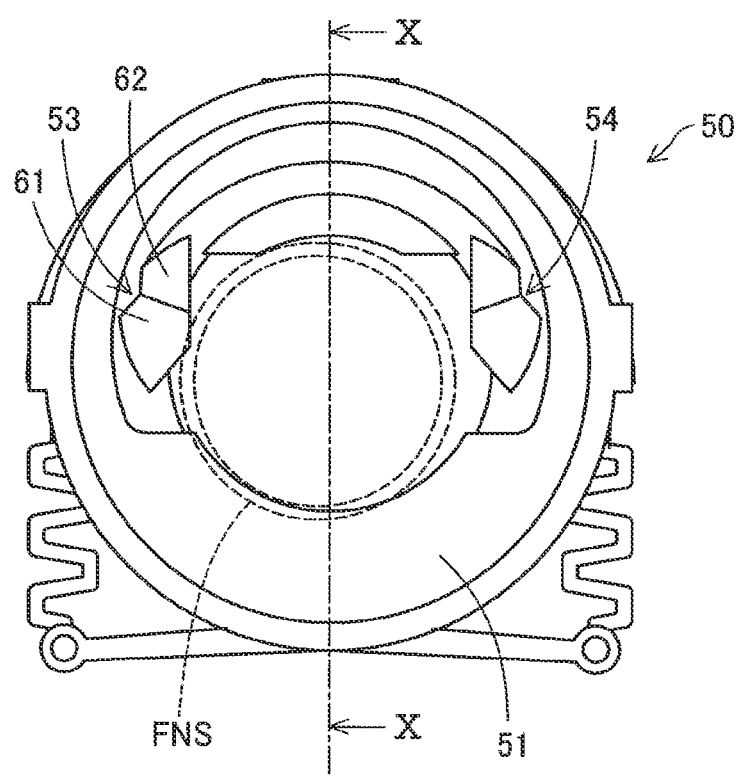
FIG. 9B is an explanatory diagram illustrating an operating state where the small-diameter nozzle is inserted into the second portion and a moving member is made to move by a guide member.
Figure 11:
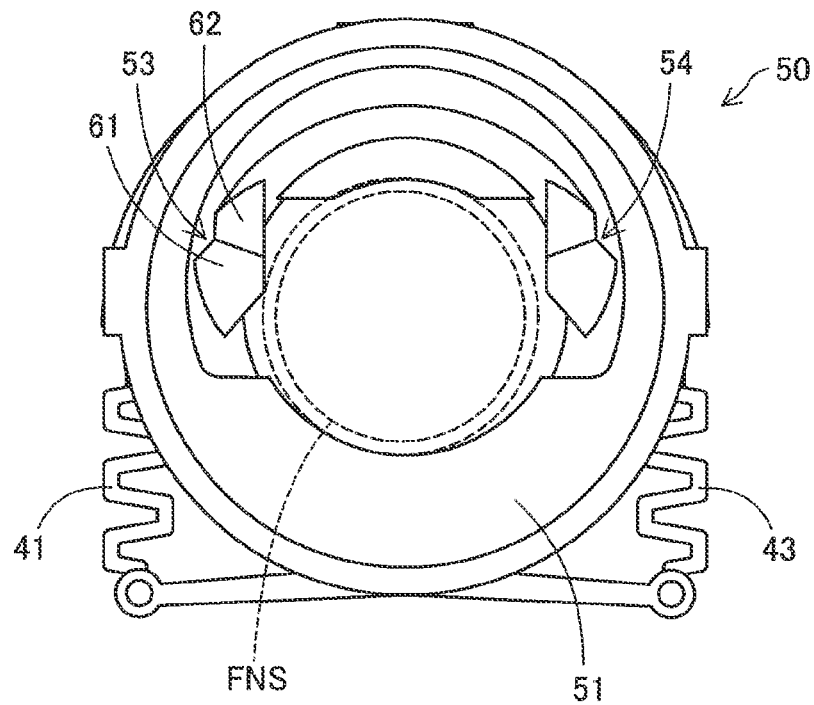
FIG. 11 is an explanatory diagram illustrating an operating state when the small-diameter nozzle is inserted into the second portion.

Now, assume a case where the tip of the small-diameter nozzle FNS abuts against the inclined portion of the conical guard 51, the small-diameter nozzle FNS is deviated in the direction of the guide member 53 as illustrated in FIG. 9B, and the second guide inclined face 61 of the guide member 53 is pushed. In this case, when the small-diameter nozzle FNS is pushed, the tip of the small-diameter nozzle FNS moves in the direction of the moving member 52 and abuts against an end of the second guide inclined face 61 of the guide member 53, and the moving member 52 may be moved outward in the radial direction of the discriminating portion 50 (direction of the arrow DI). A state where the moving member 52 is moved the furthest possible distance is illustrated in FIG. 11. In this state, the tip of the small-diameter nozzle FNS still abuts against the second guide inclined face 61 of the guide member 53 and the entire moving member 52 is pushed outward in the radial direction via the guide member 53.

Figure 10A:
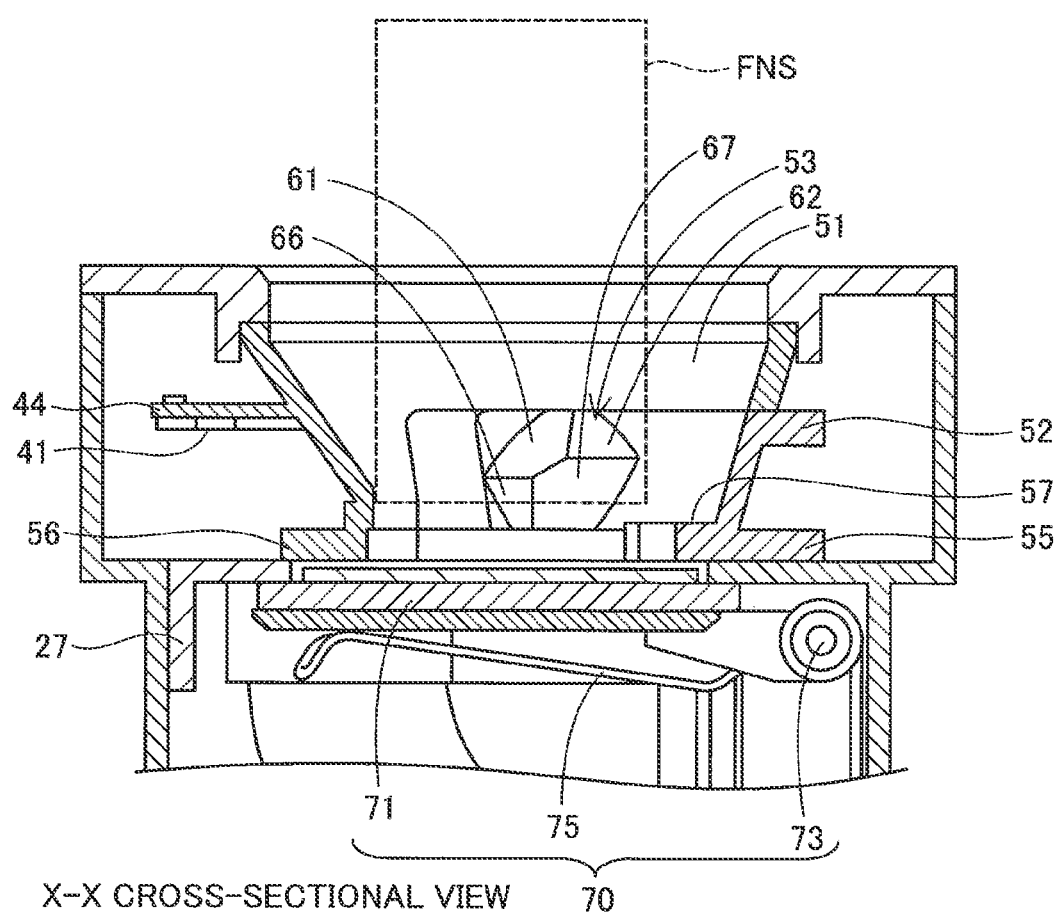
FIG. 10A is a cross-sectional view taken along the line X-X in FIG. 9B.

However, as illustrated in FIG. 10A, which is a cross-sectional view taken along the line X-X in FIG. 9, directly before or concurrent with the small-diameter nozzle FNS reaching the lower end of the conical guard 51, the tip of the small-diameter nozzle FNS passes through the lowest end of the second guide inclined face 61 of the guide member 53. A side lower than the lowest end of the second guide inclined face 61 acts as the second expanded lower face 66 and has a shape that recedes outward. Thus, the tip of the small-diameter nozzle FNS abuts against the second guide inclined face 61 of the guide member 53 and cannot be pushed. Because of this, the moving member 52 that has moved to the state illustrated in FIG. 10A is drawn back to the position illustrated in FIG. 7B, that is, the default position by restoring force generated by the spring members 41, 43. As a result, the abutting portion 57 of the moving member 52 becomes disposed below the small-diameter nozzle FNS and the small-diameter nozzle FNS is prevented from proceeding any further.

Figure 10B:
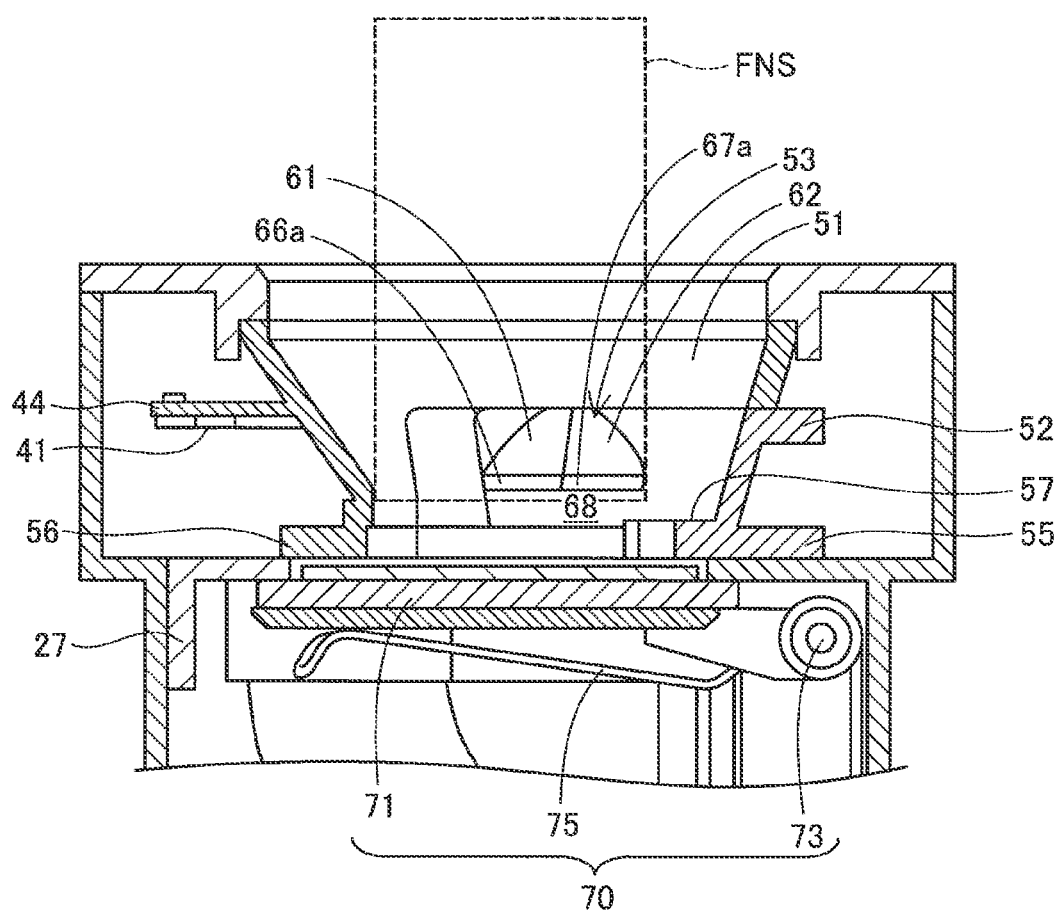
FIG. 10B is a cross-sectional view illustrating another form of the guide member.

The shape of the guide member 53 is not limited to that illustrated in FIG. 10A. For example, as illustrated in FIG. 10B, the guide member 53 may simply be a space 68 without forming the lower sides of the first guide inclined face 62 and the second guide inclined face 61, that is, the first expanded lower face 67 and the second expanded lower face 66 of the open/close member 70. Even with such a configuration, when the tip of the small-diameter nozzle FNS passes, the moving member 52 can be moved simultaneously. In the example illustrated in FIG. 10B, end portions closer to the space 68 of the second guide inclined face 61 and the first guide inclined face 62 are flat portions 66a, 67a of approximately 1 mm, but these flat portions 66a, 67a may be omitted. Providing the flat portions 66a, 67a makes it possible to increase strength of end portions of the guide member 53. The flat portions 66a, 67a are also useful for rounding such that the tip of the small-diameter nozzle FNS slides easily. Further, when the tip of the small-diameter nozzle FNS passes, the lower sides of the second guide inclined face 61 and the first guide inclined face 62 of the guide member 53 need only have a shape that cannot push the guide member 53 and may have various shapes other than the simple shape of the space 68, such as a shape that planarly recedes outward, a shape that recedes due to a curved surface, or a shape that recedes in a step shape.

The above-described operation is an operation described using a case where the tip of the small-diameter nozzle FNS abuts against the guide member 53 and the moving member 52 is forcibly moved as an example. However, because the guide member 54 has the same shape, the moving member 52 operates in the same way and the small-diameter nozzle FNS is prevented from proceeding even when the tip of the small-diameter nozzle FNS is pushed against the guide member 54 and the moving member 52 is forcibly moved. The guide member 53 and the guide member 54 need not have exactly the same shape and may have different shapes. For example, the shapes and inclinations of the second guide inclined face 63 and the first guide inclined face 64 of the guide member 54, and further at least a portion of the shape of the space portion on lower sides thereof may be different. Considering a case where a user inserts the fuel nozzle FN into the fuel supply port 22, depending on the dominant hand of the user, the angle of the fuel nozzle FN with respect to the fuel supply port 22 is often not symmetrical. Thus, the shape of guide members 53, 54 may be determined in consideration of this.

As described above, in the discriminating portion 50 according to the present, embodiment, when a small-diameter nozzle FNS having a diameter (e.g., external diameter of 19.0 mm) smaller than a fuel nozzle with an external diameter of 20.5 mm compatible with the fuel device FS is inserted, in any case the abutting portion 57 of the moving member 52 abuts against the tip of the nozzle to prevent the nozzle from proceeding. Thus, it is possible to prevent a case where a fuel nozzle that is not compatible with the fuel device FS is erroneously inserted and the wrong fuel or liquid is supplied.

Figure 12:
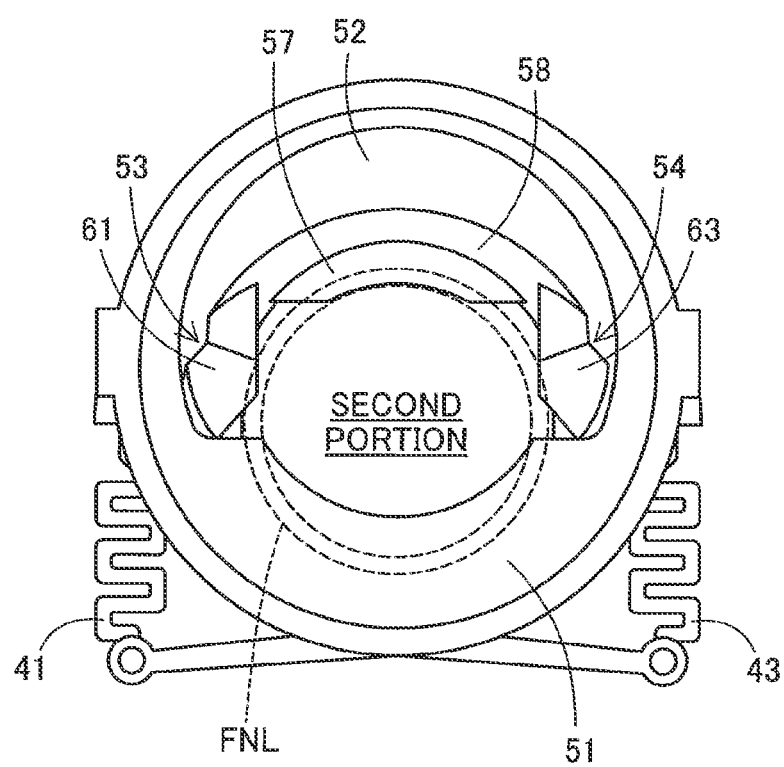
FIG. 12 is an explanatory diagram illustrating an operating state when a large-diameter nozzle is inserted into the second portion.
Figure 13:
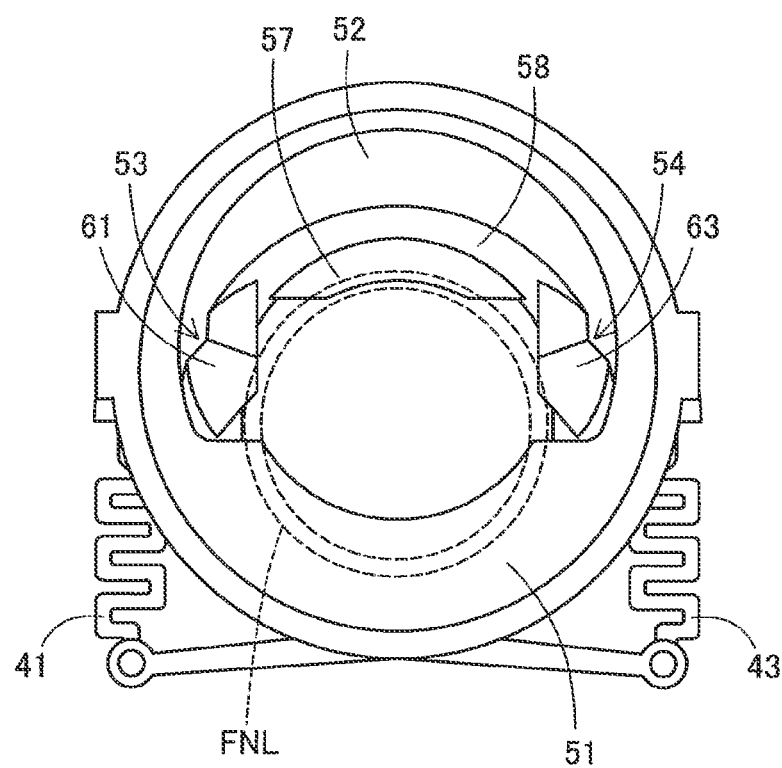
FIG. 13 is an explanatory diagram illustrating a state where the large-diameter nozzle is further inserted.

Next, operation of the discriminating portion 50 when a fuel nozzle compatible with the fuel device FS is inserted will be described. An example of a fuel nozzle compatible with the fuel device FS is a supply nozzle for gasoline having an external diameter of 20.5 mm, that is, the large-diameter nozzle FNL. FIG. 12 illustrates a state where the large-diameter nozzle FNL is inserted into the fuel supply port 22. The size of the large-diameter nozzle FNL prevents the large-diameter nozzle FNL from entering the first portion of the discriminating portion 50. The interval GD1 between the guide member 53 and the guide member 54 illustrated in FIG. 7A is smaller than the external diameter of the large-diameter nozzle FNL, and hence, even if a user attempts to insert the large-diameter nozzle FNL into the first portion and the large-diameter nozzle FNL abuts closest to the inclined portion 58 of the moving member 52, a second end of the large-diameter nozzle FNL does not abut against the first guide inclined face 62, 64 of the guide member 53, 54 and abuts against the tip of the guide member 53, 54 past the first guide inclined face 62, 64. Thus, as illustrated in FIG. 13, the large-diameter nozzle FNL is inserted into a portion on a side opposite to the moving member 52 of the discriminating portion 50, that is, a portion surrounded by the conical guard 51, the guide member 53, and the guide member 54 (this region will be referred to as a second portion).

Figure 14:
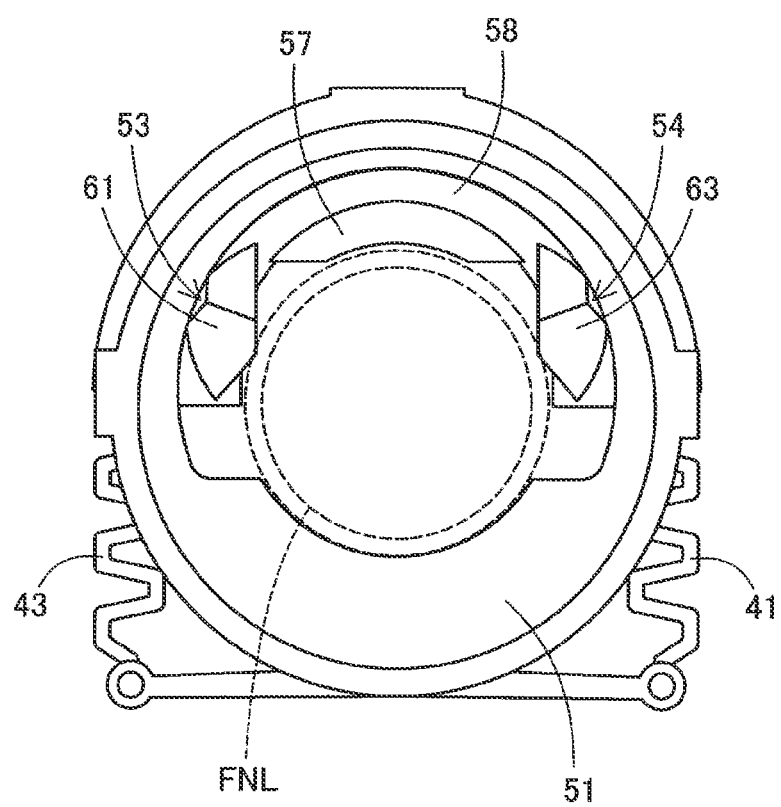
FIG. 14 is an explanatory diagram illustrating a state where the large-diameter nozzle is further inserted to the rear.

In this case, the tip of the large-diameter nozzle FNL is in contact with the inclined portion of the conical guard 51, the second guide inclined face 61 of the guide member 53, and the second guide inclined face 63 of the guide member 54. When the large-diameter nozzle FNL is further pushed from this state, portions of the large-diameter nozzle FNL are subject to radial outward force, but the conical guard 51 does not move because the conical guard 51 is fixed to the return portion 23 of the cover member 24, and the second guide inclined face 61, 63 is subject to the force such that the moving member 52 moves with respect to the conical guard 51. This movement is illustrated in FIGS. 13 and 14. Due to the moving member 52 moving outward in the radial direction, the spring members 41, 43 extend and the abutting portion 57 on the lower end of the moving member 52 also moves outward.

As a result, as illustrated in FIG. 14, in a state where the tip of the large-diameter nozzle FNL reaches the lower end of the conical guard 51, the moving flange portion 55 of the moving member 52 separates from the fixed flange portion 56 of the conical guard 51 by the distance D1, as illustrated in FIG. 4. This distance D1 is larger than the width of the abutting portion 57 in the radial direction, and hence the abutting portion 57 separates from a position below the large-diameter nozzle FNL outward in the radial direction such that the abutting portion 57 is no longer present directly below the large-diameter nozzle FNL. However, even in this state, the interval between the guide member 53 and the guide member 54 is smaller than the external diameter of the large-diameter nozzle FNL. Thus, the moving member 52 cannot return to the default position. Thus, the large-diameter nozzle FNL passes over the discriminating portion 50 without being stopped by the abutting portion 57 to proceed toward the open/close member 70, abut against the valve body 71 of the open/close member 70 and act against biasing force of the spring 75 and push the valve body 71 toward the fuel tank FT. In FIG. 8B, which illustrates a state where the small-diameter nozzle FNS is inserted while the moving member 52 is moved radially outward, when the small-diameter nozzle FNS reaches the lower end of the conical guard 51, the guide member 53 or the guide member 54 separates from the small-diameter nozzle FNS, and the moving member 52 returns to the default position to prevent the small-diameter nozzle FNS from proceeding. In contrast, in a case where the large-diameter nozzle FNL has been inserted, bottom ends of the second guide inclined faces 61, 63 of the guide members 53, 54 remain abutted against the large-diameter nozzle FNL, and hence the moving member 52 is kept at the position illustrated in FIG. 10A, the large-diameter nozzle FNL cannot proceed in this state, and the open/close member 70 is pushed open. After pushing open the open/close member 70 and proceeding, the large-diameter nozzle FNL further proceeds through the fuel passage 90 to push open the second open/close mechanism 30 and reach a position where fuel can be supplied.

In the filler neck 100 described above, the discriminating portion 50 operates as described below to discriminate between external diameters of fuel nozzles FN.

Figure 15:
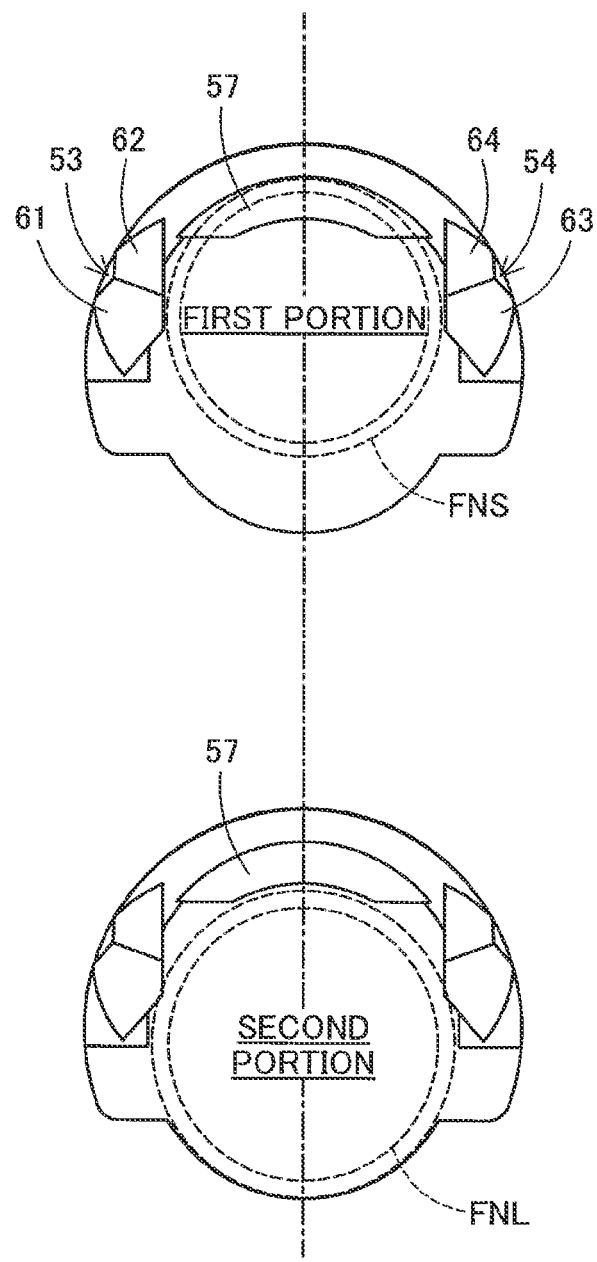
FIG. 15 is an explanatory diagram illustrating the relationship between the first portion and the second portion of a gauge member by corresponding the small-diameter nozzle and the large-diameter nozzle.

[1] In a case where the fuel nozzle FN inserted from the fuel supply port 22 is the small-diameter nozzle FNS, which is a fuel nozzle not compatible with the fuel device FS, as illustrated in the top half of FIG. 15, the small-diameter nozzle FNS is driven into the first portion closer to the abutting portion 57 as viewed from the guide members 53, 54, and the small-diameter nozzle FNS is prevented from proceeding by the abutting portion 57. At this time, when the small-diameter nozzle FNS is inserted into the vicinity of the first portion, even if the position at which the small-diameter nozzle FNS is inserted deviates slightly relative to the first portion, the first guide inclined faces 62, 64 of the guide members 53, 54 guide the small-diameter nozzle FNS to the first portion. Providing the abutting portion 57 below the small-diameter nozzle FNS is done because the interval GD1 between the guide member 53 and the guide member 54 is larger than the external diameter of the small-diameter nozzle FNS, and hence the small-diameter nozzle FNS cannot move the guide members 53, 54 radially outward with the point of contact with the conical guard 51 as a fulcrum. Further, even if the guide members 53, 54 are moved forcibly, if the tip of the small-diameter nozzle FNS passes the second guide inclined faces 61, 63 of the guide members 53, 54, the second expanded lower face 66 below the second guide inclined faces 61, 63 has a shape that recedes outward, and this shape releases engagement between the guide members 53, 54 and the small-diameter nozzle FNS such that the moving member 52 returns to the default position and the abutting portion 57 prevents the small-diameter nozzle FNS from proceeding.

[2] In a case where the fuel nozzle FN inserted from the fuel supply port 22 is the large-diameter nozzle FNL, which is a fuel nozzle compatible with the fuel device FS, as illustrated in the lower half of FIG. 15, the large-diameter nozzle FNL guided by the second guide inclined faces 61, 63 of the guide members 53, 54 to be led into the second portion on a side opposite to the abutting portion 57 as viewed from the guide members 53, 54. At this time, because the interval GD1 between the guide member 53 and the guide member 54 is smaller than the external diameter of the large-diameter nozzle FNL, the large-diameter nozzle FNL pushes the guide members 53, 54 with the point of contact with the conical guard 51 as a fulcrum, and the moving member 52 can be moved radially outward. With this configuration, the abutting portion 57 can be moved from below the large-diameter nozzle FNL and the large-diameter nozzle FNL can proceed to the fuel passage 90 past the discriminating portion 50 to open the open/close member 70.

As illustrated in FIG. 15, the first portion that guides the small-diameter nozzle FNS and prevents the small-diameter nozzle FNS from proceeding and the second portion that guides the large-diameter nozzle FNL and allows the large-diameter nozzle FNL to proceed are connected, and an open space formed by combining the first portion and the second portion corresponds to an discrimination opening.

As described above, the fuel device FS according to the first embodiment can use the interval GD1 between the guide member 53 and the guide member 54 as a gauge to accurately discriminate the external diameter of a fuel nozzle. Because of this, accounting for manufacturing tolerances, the fuel device FS can accurately discriminate between an AdBlue fuel nozzle (external diameter of 19.0 mm) and a gasoline fuel nozzle (external diameter of 20.5 mm) having a difference of approximately 1 mm and prevent a fuel nozzle that is not compatible with the fuel device FS from proceeding, which can reduce the occurrence of a different type of fuel from erroneously being supplied. In this case, setting the size of the second portion such that a nozzle with an external diameter exceeding 20.5 mm is prevented from passing through makes it easy to prevent the entry of fuel nozzles for diesel. On the other hand, when the fuel device FS is designed for used with diesel and the interval between the guide members 53, 54 is set slightly larger than 20.5 mm, which is the diameter of a nozzle for gasoline and the diameter of the small-diameter nozzle FNS, and set smaller than 23.5 mm, which is the diameter of a nozzle for diesel and the diameter of the large-diameter nozzle FNL, for example, is set to 22.0 mm, if the diameters of the first portion and the second portion are set to match this, it is easy to configure the fuel device FS in which a diesel fuel nozzle can proceed and a gasoline nozzle cannot proceed with a similar configuration. In this case, even if the nozzle is an AdBlue nozzle (external diameter of 19 mm), the fuel device FS discriminates this nozzle as an incompatible nozzle and does not permit the nozzle to proceed, similar to the small-diameter nozzle FNS.

B. Second Embodiment

Figure 16:
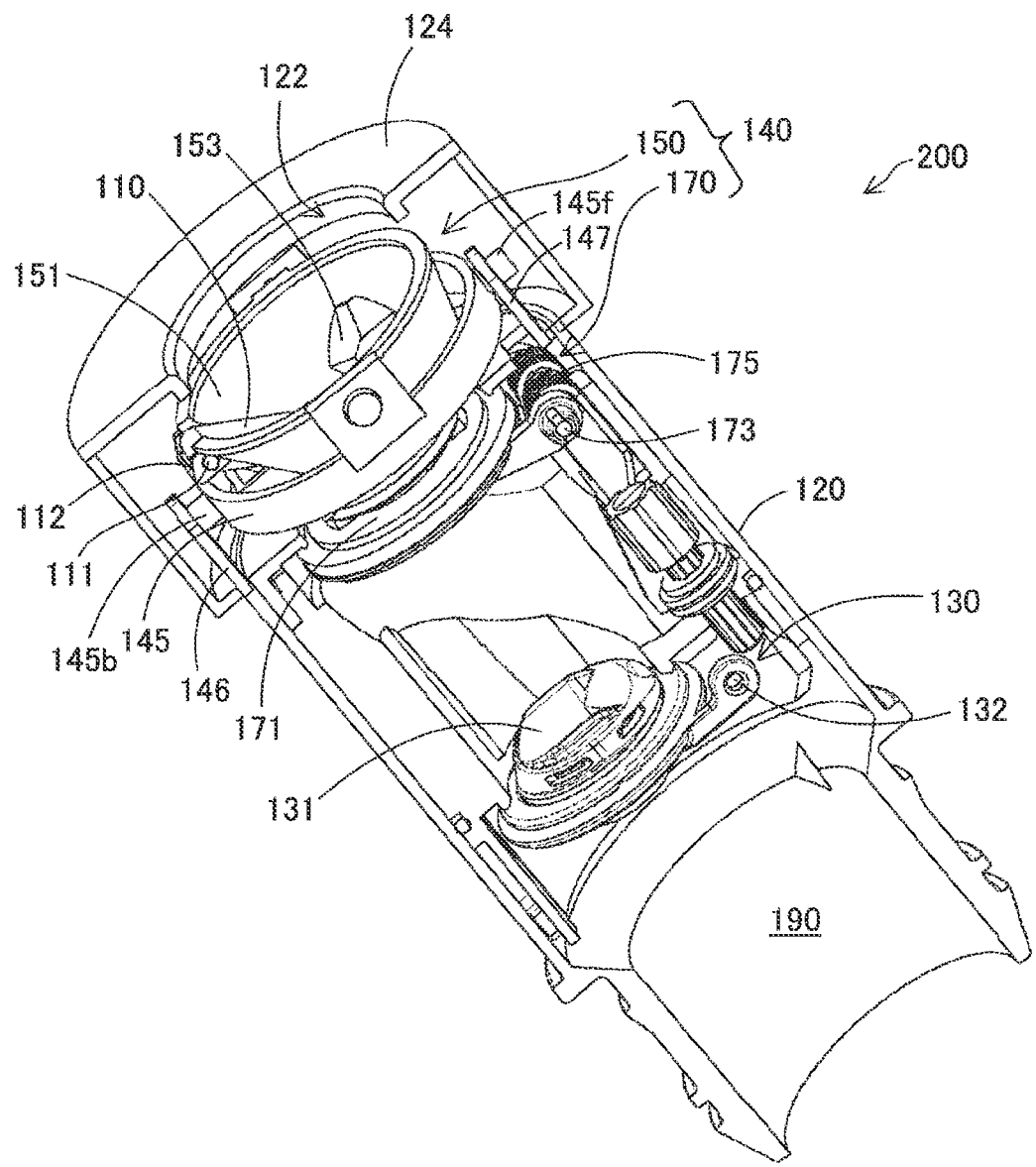
FIG. 16 is a perspective view illustrating the external appearance of a filler neck into which a fuel device according to a second embodiment is incorporated.

Next, a filler neck 200 used for a fuel device FS will be described as a second embodiment. FIG. 16 is a perspective view for illustrating a schematic configuration of the filler neck 200 as a second embodiment. Similar to FIG. 2, FIG. 16 illustrates a state where members forming the fuel passage at the front in the figure have been removed. The filler neck 200 of the second embodiment includes, from the side of a cover member 124 forming a fuel supply port 122, a first open/close mechanism 140, and a second open/close mechanism 130. The first open/close mechanism 140 and the second open/close mechanism 130 are both located in a region that reaches the fuel nozzle FN and are opened by a fuel nozzle FN compatible with the fuel device FS being inserted, which is the same as the first embodiment. However, the fuel device FS of the second embodiment is designed for use with diesel and a fuel nozzle for diesel (external diameter of 23.5 mm) is a large-diameter nozzle FNL compatible with this fuel device FS. A fuel nozzle for gasoline (external diameter of 20.5 mm) or a fuel nozzle with an external diameter smaller than this is discriminated as a small-diameter nozzle FNS that is not compatible.

As illustrated, the second open/close mechanism 130 is disposed in a lower portion of the fuel passage forming portion 120 closest to the fuel tank and is configured to open/close a fuel passage 190. The second open/close mechanism 130 includes a second open/close valve 131 configured to open/close the fuel passage 190 and a spring (not shown) that is fixed to the fuel passage forming portion 120 and configured to bias the second open/close valve 131. The second open/close valve 131 is a flap that prevents liquid fuel from flowing back toward the insertion side from the fuel tank side and includes a sealing member used for sealing. The second open/close valve 131 is rotatably supported by a rotation shaft 132 provided in the fuel passage forming portion 120 and is biased by the spring in a direction in which the fuel passage 190 closes the second open/close valve 131.

A first open/close mechanism 140 is provided closer to the fuel supply port 122 than the second open/close mechanism 130 and includes a discriminating portion 150 that functions as a gauge member and an operation member and an open/close member 170 provided closer to the fuel tank FT than the discriminating portion 150. The discriminating portion 150 is entirely made of resin. The configuration of the discriminating portion 150 will be described with reference to FIGS. 17 to 29. The discriminating portion 150 is formed with a circular entrance through which a fuel nozzle compatible with the fuel device FS can proceed, and includes a tapered conical guard 151 provided on an inner side of the discriminating portion 150, an annular holding member 145 that movably holds the conical guard 151, and a starting member 110 provided partway down the conical guard 151. The conical guard 151 has an upper end portion on an upper edge periphery thereof, but unlike the first embodiment, the upper end of the conical guard 151 is not fixed. Thus, when the fuel nozzle FN is inserted, the conical guard 151 moves as described below depending on how the tip of the fuel nozzle FN abuts.

Figure 17:
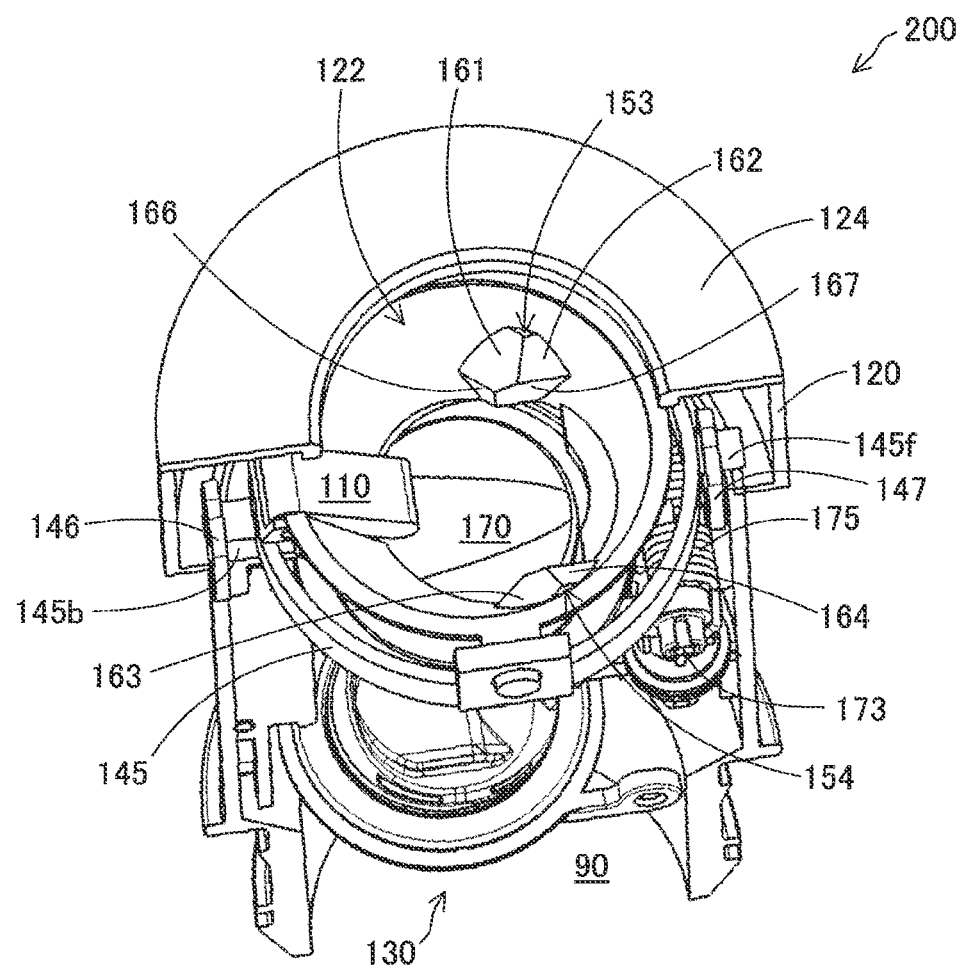
FIG. 17 is an explanatory diagram illustrating the default form of a discriminating portion incorporated into the filler neck according to the second embodiment.
Figure 18:
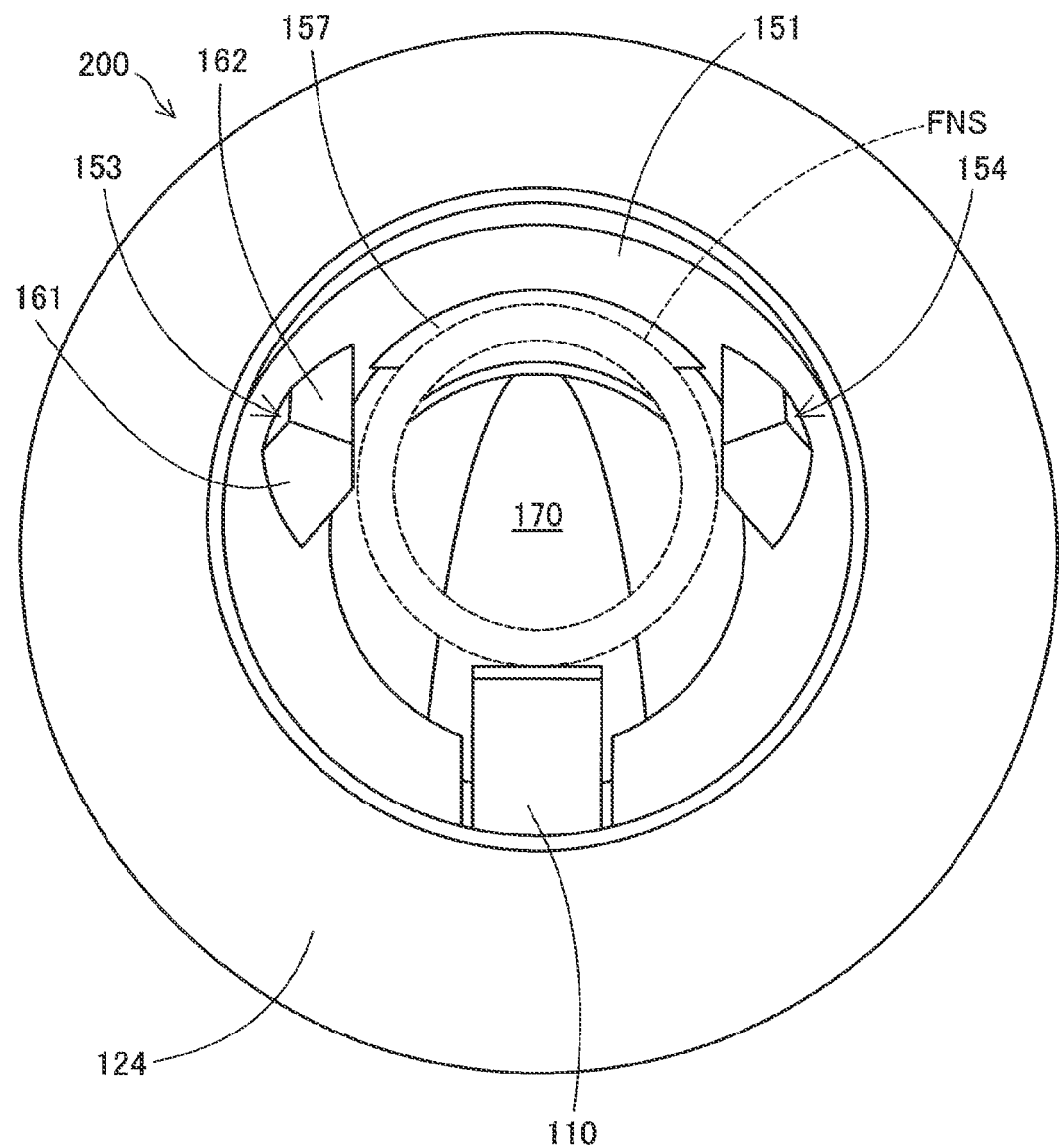
FIG. 18 is an explanatory diagram illustrating an example of the position of the small-diameter nozzle when the small-diameter nozzle is inserted into the first portion.
Figure 19:
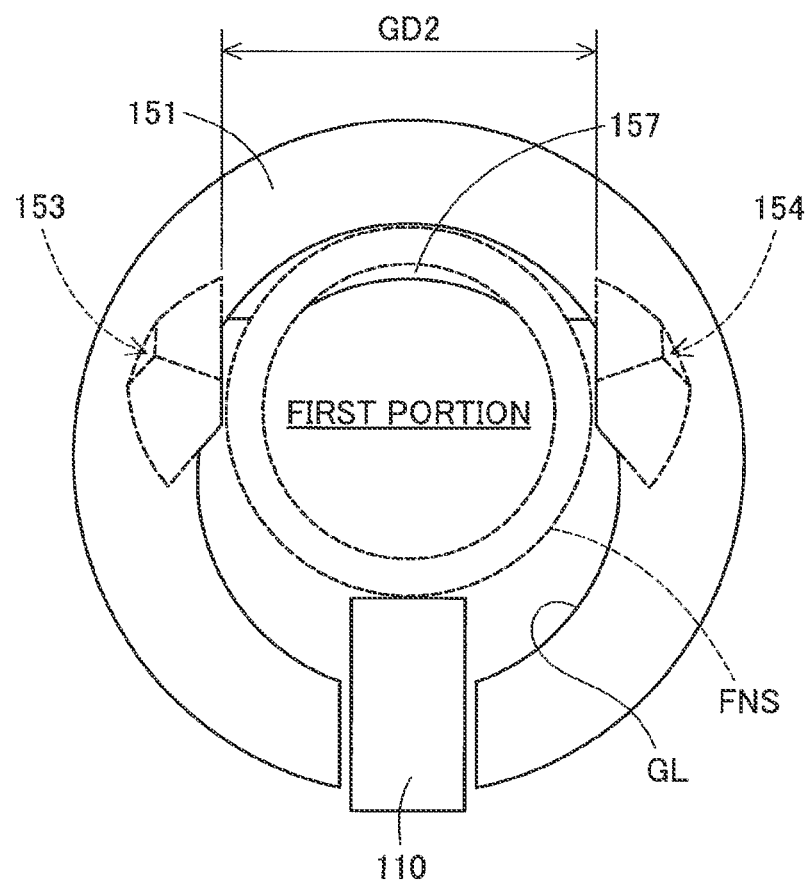
FIG. 19 is an explanatory diagram illustrating the relationship of the interval between the guide member and the small-diameter nozzle inserted into the first portion.
Figure 20:
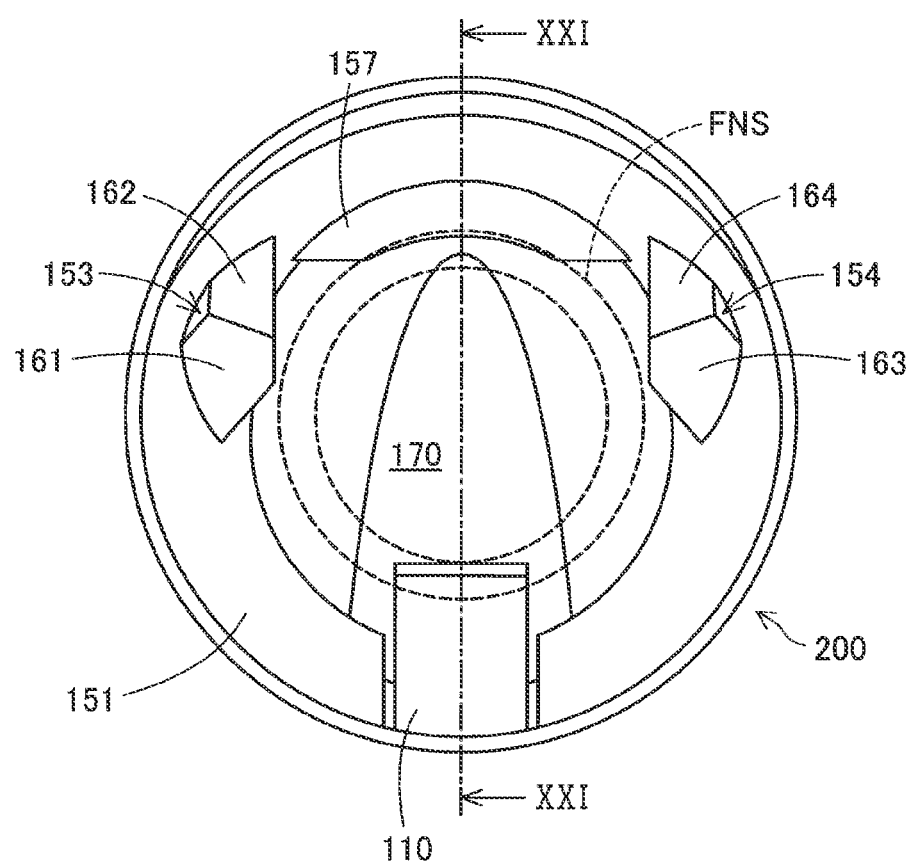
FIG. 20 is an explanatory diagram illustrating a state where the small-diameter nozzle is inserted into the second portion.

The conical guard 151 of the second embodiment generally has a shape formed by combining the conical guard 51 and the moving member 52 of the first embodiment, except that the starting member 110 is provided. Thus, similar to the first embodiment, the inner side of the conical guard 151 is provided with guide members 153, 154 and a lower edge of the conical guard 151 is provided with an abutting portion 157. The guide member 153 and the guide member 154 face each other separated by a predetermined distance. In FIG. 18, a fuel nozzle with a small nozzle is illustrated with a broken line as a reference. The upper half of the guide member 153 is formed with a second guide inclined face 161 and a first guide inclined face 162, which are inclined faces inclined in different directions, and the upper half of the guide member 154 is formed with a second guide inclined face 163 and a first guide inclined face 164, which are inclined in different directions. As illustrated in FIG. 17, the lower half of the guide member 153 is formed into a shape that recedes outward from ends of the first and second guide inclined faces 162, 161. Hereinafter, a lower inclined face of the first guide inclined face 162 will be referred to as a first expanded lower face 167, and a lower inclined face of the second guide inclined face 161 will be referred to as a second expanded lower face 166. In FIGS. 18 to 20, the shape of the lower half of the guide member 154 is not illustrated, but the guide member 153, 154 has the same shape as that of the guide member 53, 54 of the first embodiment, and both guide members 153, 154 form a mirror-image shape. The first guide inclined faces 162, 164 of the guide members 153, 154 are oriented toward the abutting portion 157 and the second guide inclined faces 161, 163 are oriented toward a side opposite to the abutting portion 157.

The abutting portion 157 at the lower portion of the conical guard 151 has an arc shape that protrudes inward of the conical guard 151 by a predetermined distance at a lower edge of the conical guard 151. The shape of the opening of the conical guard 151 when the conical guard 151 is viewed in plan from the fuel supply port 122 side is illustrated in FIG. 19. In FIG. 19, a lower edge opening of the conical guard 151 is illustrated with a solid line as an discrimination opening GL, supposing a case where the abutting portion 157 is not present. In plan view, among the shape of the discrimination opening GL that forms an open space between the guide members 153, 154 and the lower edge of the conical guard 151, the side on which the abutting portion 157 is present is referred to as a first portion of the discriminating portion 150. The first portion is designed to accommodate a fuel nozzle with a diameter smaller than that of the fuel nozzle FN compatible with the fuel device FS. In the second embodiment, an interval GD2 between inner dimensional positions formed by a radial inner end portion of the guide member 153 and a radial inner end portion of the guide member 154 is also set to 22 mm. The interval GD2 is slightly larger than the external diameter of the small-diameter nozzle FNS and slightly smaller than the external diameter of the large-diameter nozzle FNL.

The conical guard 151 is provided with a start-up member 110 on a side opposite to the abutting portion 157. As illustrated in FIGS. 16 and 17, the start-up member 110 is held at an angle that is slightly smaller than that of the inclined portion of the conical guard 51. The start-up member 110 can rotate downward from this position, that is, in the direction of the open/close member 170 and is held by the conical guard 51 via the rotating shaft 111. In addition, the start-up member 110 is biased by the spring 112 by a predetermined elastic force F1 upward, that is, toward the fuel supply port 122.

The conical guard 51 including the start-up member 110 is held entirely in the holding member 145 by an engagement portion 143. The holding member 145 includes sliding members 145b, 145f provided at two positions along an axis that passes through the center of the start-up member 110 and the abutting portion 157. The sliding members 145b, 145f can slidably engage with grooves formed in support columns 146, 147 that are fixed to the fuel passage forming portion 120. Thus, the holding member 145 is supported such that the holding member 145 can move in the direction of the sliding member 145b or the sliding member 145f.

The movement of the holding member 145 is generated by the tip of the fuel nozzle FN pushing the inclined portion of the conical guard 151 or the start-up member 110. Force required to slide the holding member 145 in the radial direction of the fuel passage 190 by pushing the inclined portion of the conical guard 151 or the start-up member 110, the holding member 145 is referred to herein as a movement force F2. In the present embodiment, the holding member 145 is not biased by a spring or similar components in any radial direction. Thus, the elastic force F1 and the movement force F2 generated by the spring 112 satisfy the following relationship:

$$F1 \gg F2$$

Note that a coil spring or similar component may be disposed between the support column 146 and the holding member 145 and the holding member 145 may be biased toward the support column 147 with respect to the support column 146, such that the holding member 145 is located closest to the support column 147 in a state where the movement force F2 does not act on the conical guard 151 or the start-up member 110. In the present embodiment, a position at which the holding member 145 is located closest to the support column 147 is referred to as the default position of the conical guard 151.

The open/close member 170 provided on a lower side of the discriminating portion 150 including the conical guard 151 and the holding member 145 described above, that is, provided on the fuel tank FT side includes the valve body 171 configured to cover the first portion illustrated in FIG. 19, the holding shaft 173 configured to rotatably hold the valve body 171 in the fuel passage forming portion 20, and the spring 175 having a first end fixed to the holding shaft 173 and a second end disposed in contact with a lower face of the valve body 171. Because the valve body 171 is biased in the closing direction by the spring 175, the valve body 171 is held at a position covering the fuel passage 190, provided that no external force acts on the valve body 171.

Now, operation of the filler neck 200 according to the above-described second embodiment will be described. In a case where the small-diameter nozzle FNS is inserted into the fuel device FS and the tip of the small-diameter nozzle FNS is inserted into the first portion without being in contact with the inclined portion 58 of the conical guard 151 or other components, as illustrated in FIG. 18, the tip of the small-diameter nozzle FNS abuts against the abutting portion 157 at the lower end of the conical guard 151 and cannot proceed any further. Thus, the tip of the small-diameter nozzle FNS cannot move the valve body 171 of the open/close member 170 in the open direction. Even if the position at which the small-diameter nozzle FNS is inserted slightly deviates relative to the first portion, the first guide inclined faces 162, 164 of the guide members 153, 154 guide the small-diameter nozzle FNS to the first portion. This operation is the same as the first embodiment.

Figure 21:
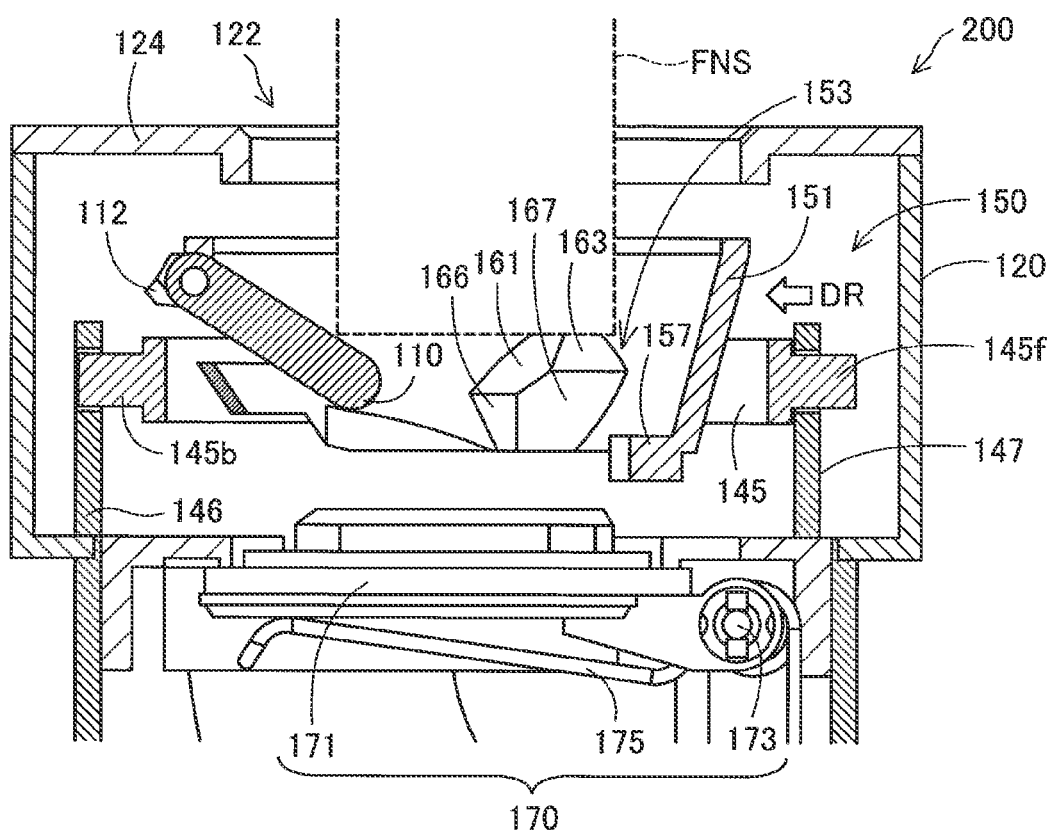
FIG. 21 is a cross-sectional view taken along the line XXI-XXI in FIG. 20.

On the other hand, as illustrated in FIG. 20, at a position where the small-diameter nozzle FNS is avoiding the abutting portion 157 and has entered from the fuel supply port 122, an end portion on a side opposite to the abutting portion 157 of the small-diameter nozzle FNS abuts against the start-up member 110 provided in the conical guard 151. In this state, as illustrated in FIG. 21, which is a cross-sectional view taken along the line XXI-XXI in FIG. 20, the tip of the small-diameter nozzle FNS abuts against the start-up member 110 and pushes the start-up member 110 downward, that is, toward the open/close member 170. At this time, the start-up member 110 is biased upward by the elastic force F1 generated by the spring 112, and hence the small-diameter nozzle FNS causes a force FF that pushes the start-up member 110 to act. The holding member 145 and thus the conical guard 151 moves toward the support column 146 before the start-up member 110 is pushed down if this force satisfies the following relationship:

$$FF > F2$$

Figure 22:
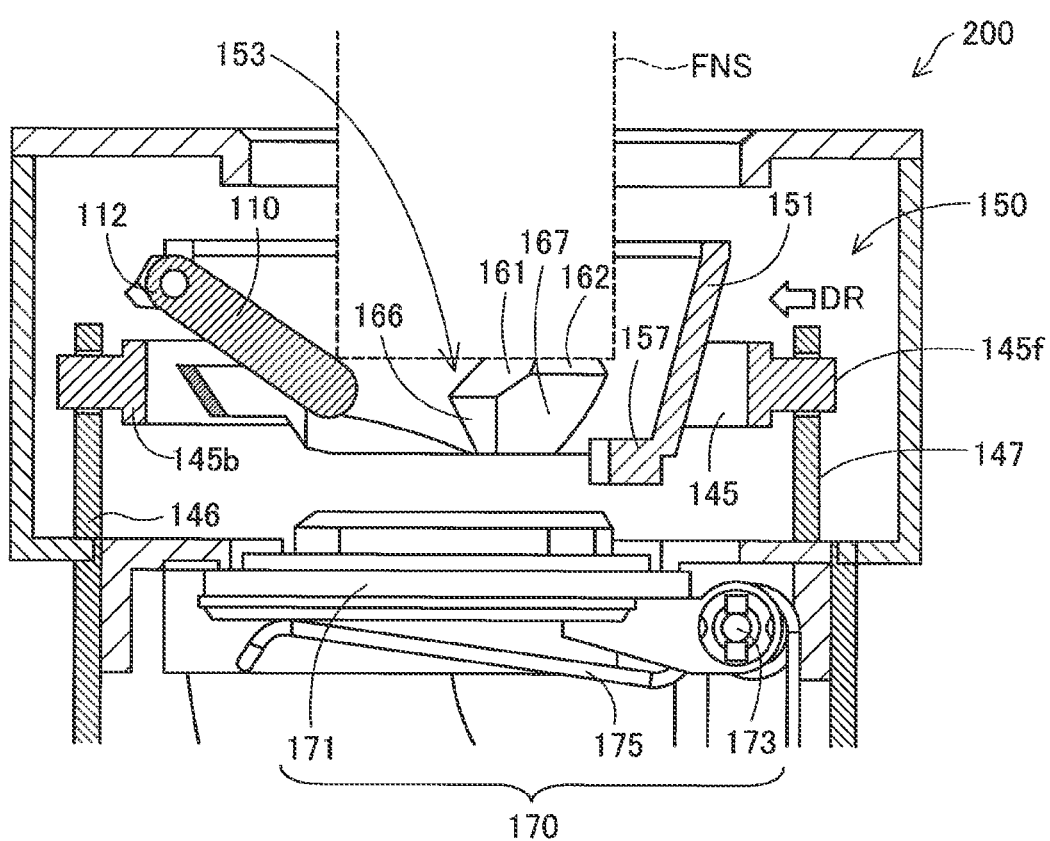
FIG. 22 is a cross-sectional view illustrating a state where the small-diameter nozzle is further inserted.
Figure 23:
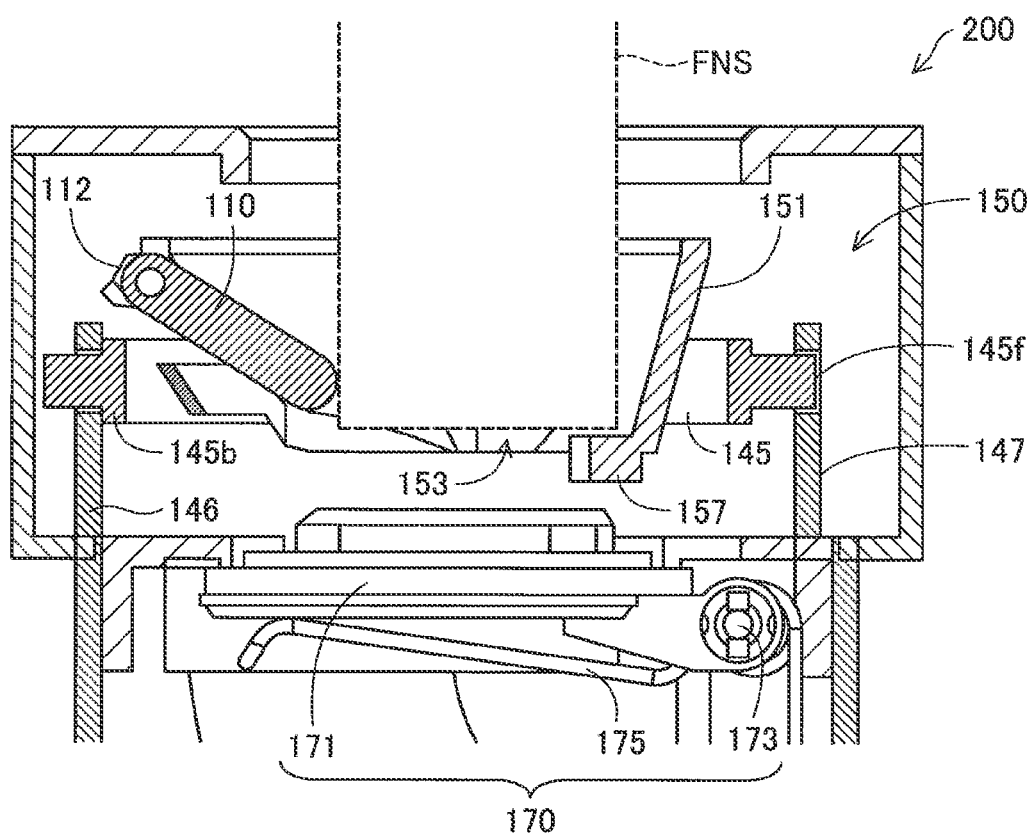
FIG. 23 is a cross-sectional view illustrating a state where the small-diameter nozzle is further inserted to the rear.

As a result, as illustrated in FIG. 22, along with the movement of the holding member 145, the conical guard 151 also moves toward the support column 146, and the abutting portion 157 on the lower edge of the conical guard 151 also moves in the direction of the arrow DR so as to finally be located below the small-diameter nozzle FNS. Thus, if the small-diameter nozzle FNS is pushed to the rear in this state, the small-diameter nozzle FNS is finally pushed in the direction of the arrow DR and, as illustrated in FIG. 23, the tip of the small-diameter nozzle FNS abuts against the abutting portion 157 and cannot proceed any further.

Thus, in the filler neck 200 according to the second embodiment, when a small-diameter nozzle FNS that is not compatible with the fuel device FS is inserted from the fuel supply port 122, the small-diameter nozzle FNS is guided to the first portion illustrated in FIG. 20, regardless of where the small-diameter nozzle FNS is inserted into the discrimination opening of the conical guard 151, and the abutting portion 157 prevents the small-diameter nozzle FNS from proceeding any further. Note that, similar to the first embodiment, even if the tip of the small-diameter nozzle FNS forcibly abuts against the second guide inclined face 161 of the guide member 153 on one side and the start-up member 110 is pushed down, the lower side lower than the bottom edge of the second guide inclined face 161 is formed into a shape that recedes outward as the second expanded lower face 166, and hence, even if the tip passes through the bottom edge of the second guide inclined face 161, the tip of the small-diameter nozzle FNS abuts against the second guide inclined face 161 of the guide member 153 and cannot be pushed any longer. Because of this, the start-up member 110 that has been pushed down returns to its original position due to force of the spring 112, and the holding member 145 and thus the conical guard 151 move toward the support column 146. As a result, the abutting portion 157 is now disposed below the small-diameter nozzle FNS and prevents the small-diameter nozzle FNS from proceeding any further. The shape of a side lower than the second guide inclined face 161 and the first guide inclined face 162 of the guide member 153, that is, the shape of the open/close member 170 may be a shape other than that of the second expanded lower face 166 and the first expanded lower face 167, such as a simple space portion, similar to the first embodiment. The same applies to the guide member 154.

Figure 24:
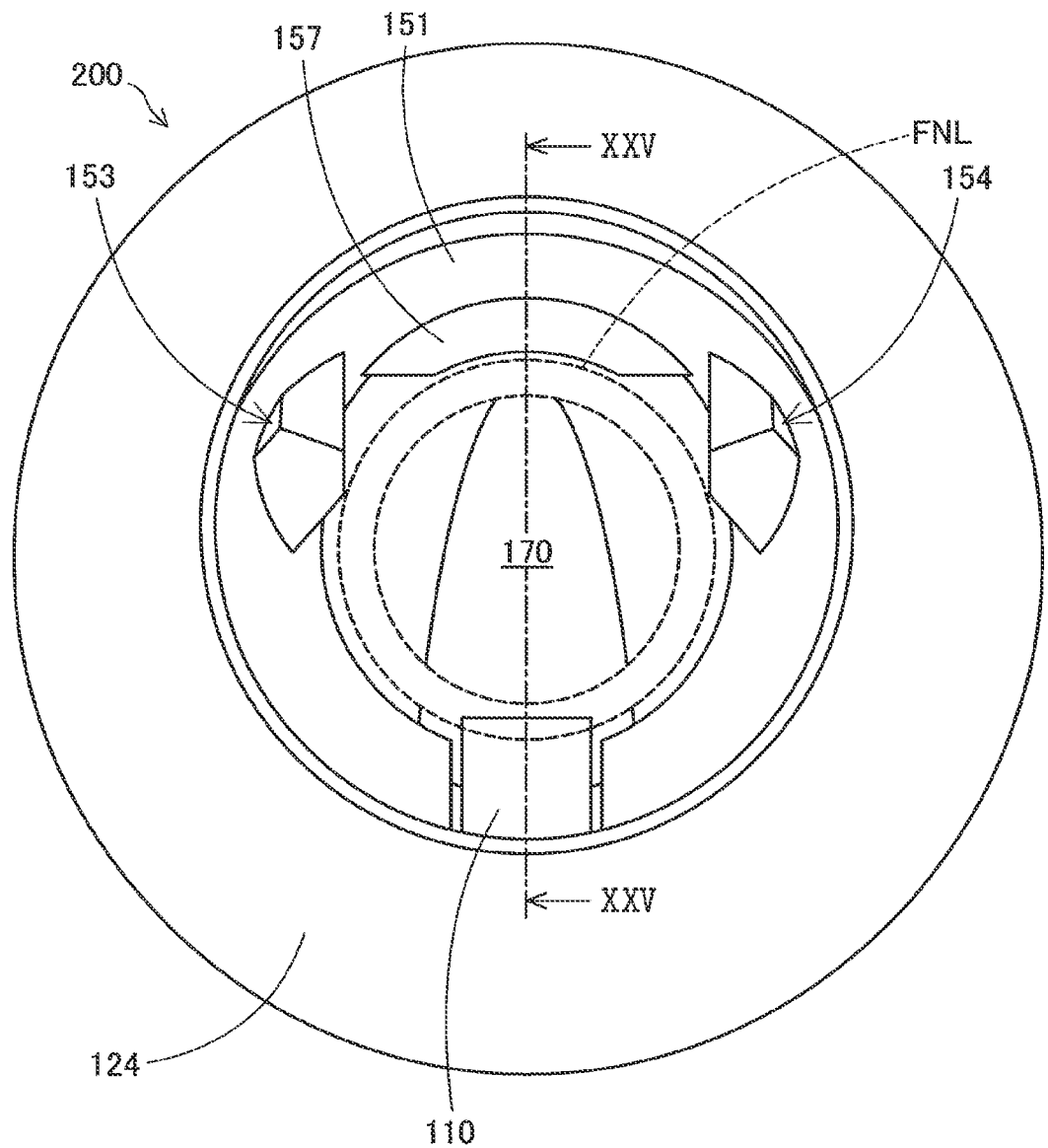
FIG. 24 is an explanatory diagram illustrating a state where the large-diameter nozzle is inserted into the second portion.
Figure 25:
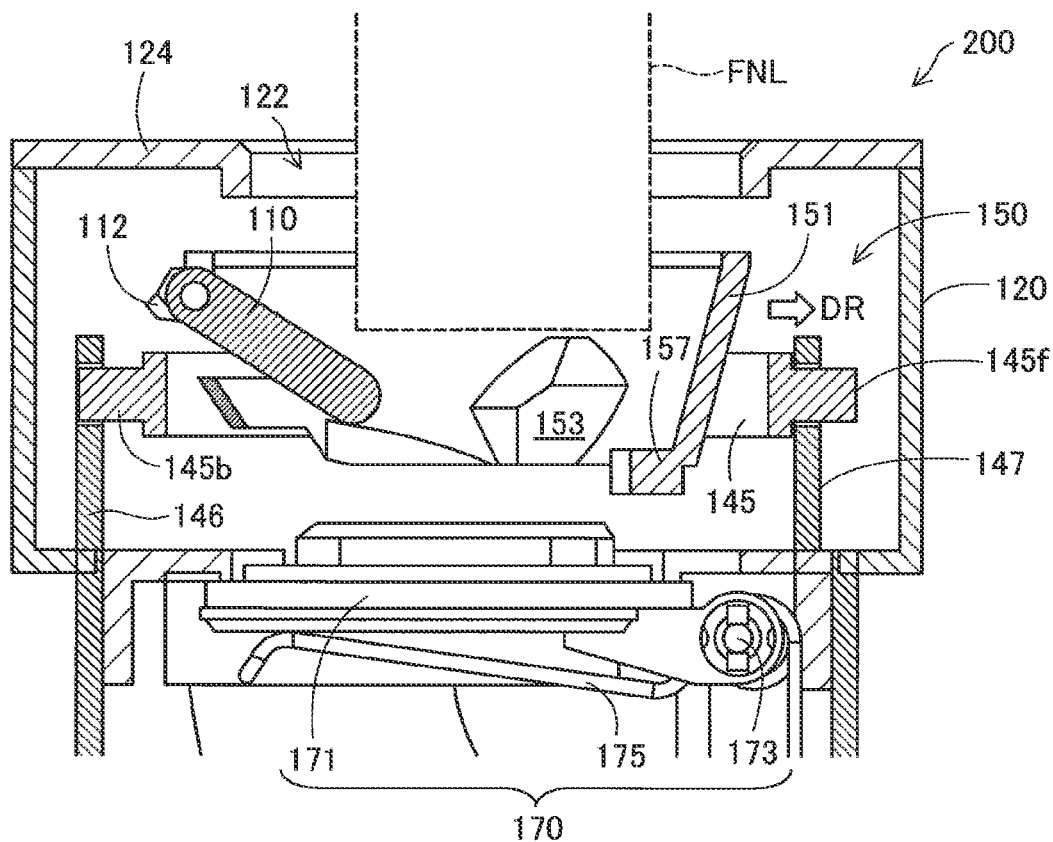
FIG. 25 is a cross-sectional view taken along the line XXV-XXV in FIG. 24.

In contrast, in a case where the large-diameter nozzle FNL having an external diameter compatible with the fuel device FS is inserted from the fuel supply port 122, the large-diameter nozzle FNL cannot be inserted into the first portion of the discrimination opening of the conical guard 151 due to the guide members 153, 154 blocking the way. Thus, as illustrated in FIG. 24, the large-diameter nozzle FNL is inserted into the second portion of the discrimination opening of the conical guard 151. This state is illustrated in FIG. 25, which is a cross-sectional view taken along the line XXV-XXV in FIG. 24. If the large-diameter nozzle FNL is pushed further from this state, the end portion of the large-diameter nozzle FNL closer to the abutting portion 157 abuts against the second guide inclined faces 161, 163 of the guide members 153, 154, and a side opposite to the large-diameter nozzle FNL abuts against the start-up member 110. In this state, the large-diameter nozzle FNL abuts against the guide members 153, 154. Thus, with the large-diameter nozzle FNL in this position as a starting point, the start-up member 110 is pushed and the conical guard 151 does not move due to the holding member 145. The start-up member 110 rotates toward the open/close member 170 if the force FF that pushes the large-diameter nozzle FNL satisfies the following relationship with the elastic force F1 of the spring 112 that biases the start-up member 110:

$$FF > F1$$

Figure 26:
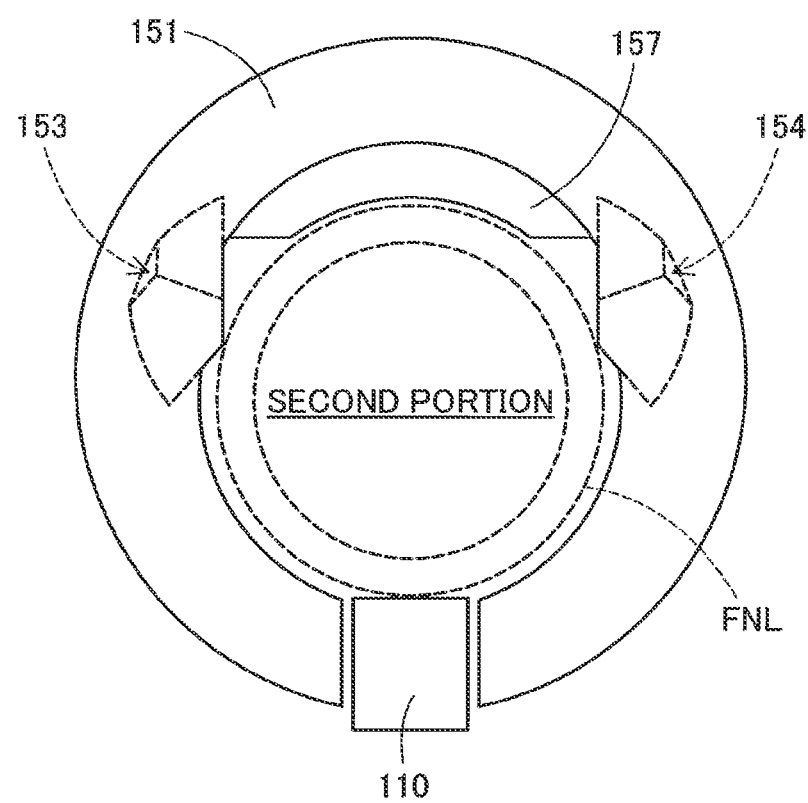
FIG. 26 is an explanatory diagram illustrating the relationship of the interval between the guide member and the large-diameter nozzle inserted into the second portion.

As a result of the rotation of the start-up member 110, in plan view, the start-up member 110 retreats from the second portion that accepts the large-diameter nozzle FNL and, as illustrated in FIG. 26, the large-diameter nozzle FNL is finally inserted into the second portion of the discrimination opening of the conical guard 151.

Figure 27:
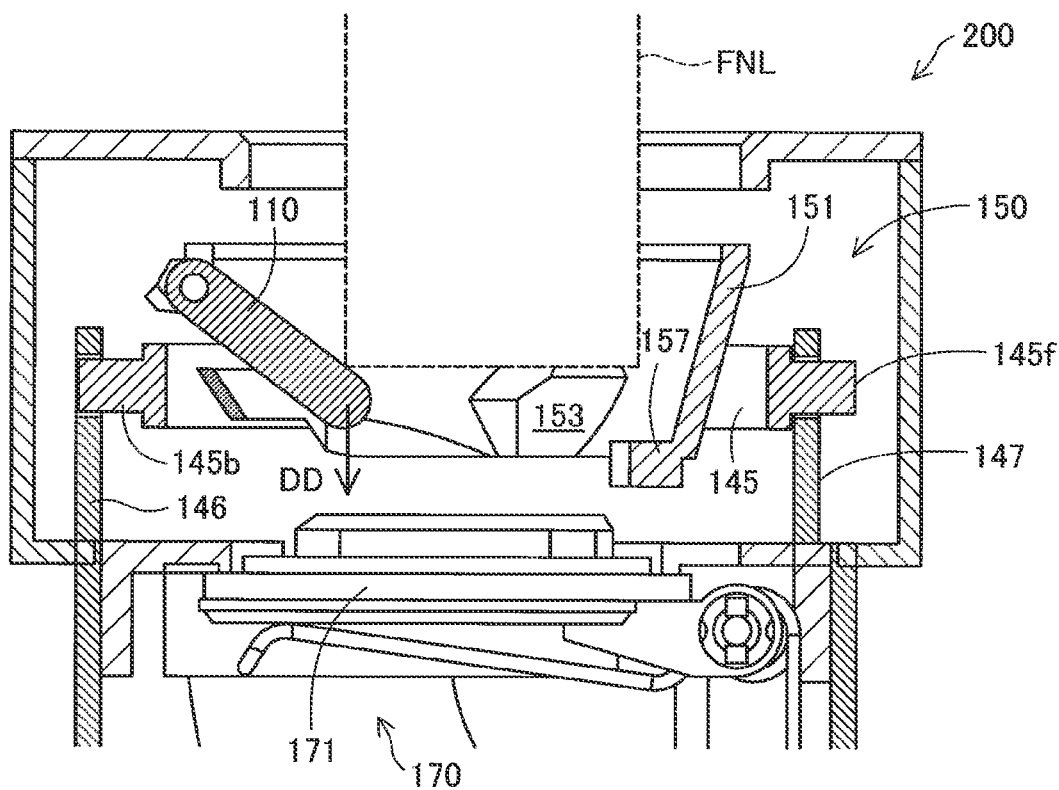
FIG. 27 is a cross-sectional diagram illustrating a state where the large-diameter nozzle is further inserted.
Figure 28:
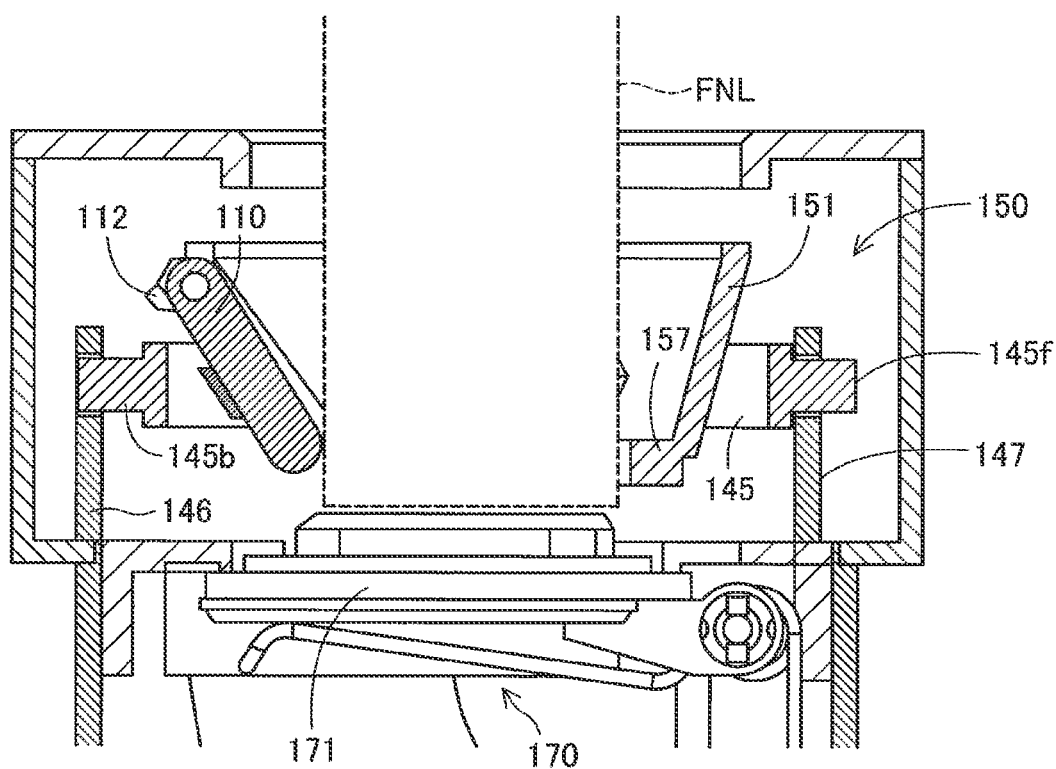
FIG. 28 is a cross-sectional diagram illustrating a state where the large-diameter nozzle is further inserted to the rear.
Figure 29:
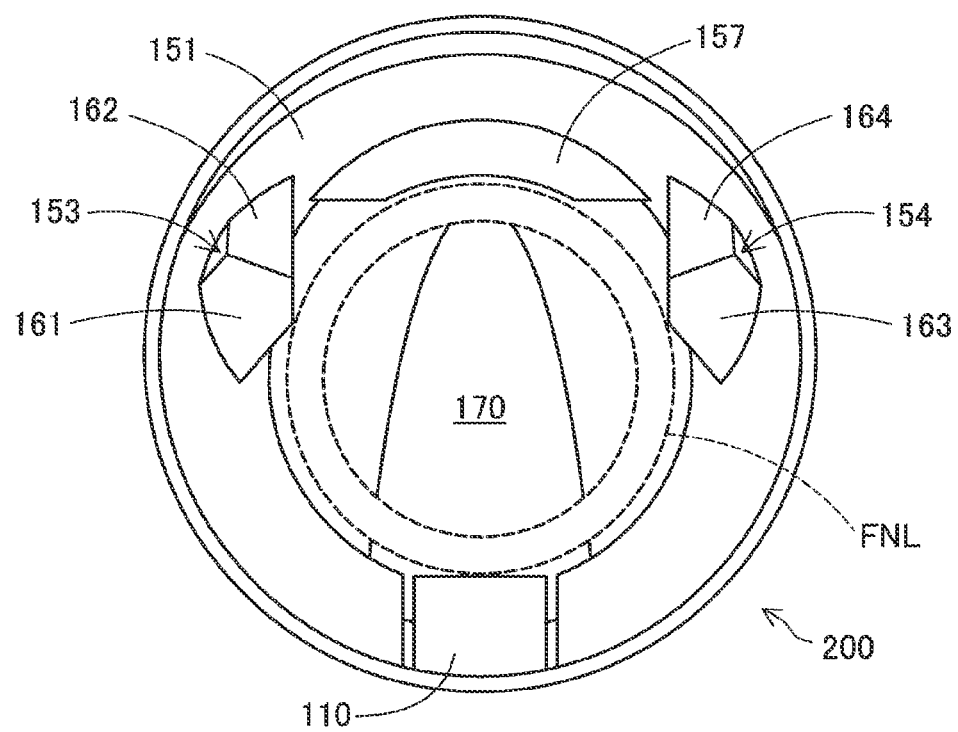
FIG. 29 is an explanatory diagram illustrating a state where the large-diameter nozzle reaches an open/close member.

The operation of each component at this time is illustrated in FIGS. 27 and 28. The large-diameter nozzle FNL is inserted into the fuel supply port 122 and the tip of the large-diameter nozzle FNL abuts against the second guide inclined faces 161, 163 of the guide members 153, 154 and the start-up member 110 (FIG. 22). Further, the insertion of the large-diameter nozzle FNL causes the start-up member 110 to rotate and the tip of the large-diameter nozzle FNL to move in the direction of the arrow DD (FIG. 27), that is, toward the open/close member 170 and radially outward. In addition, when the large-diameter nozzle FNL is inserted, the tip of the start-up member 110 opens until a position abutting against a side face of the large-diameter nozzle FNL (FIG. 28). During this time, in the conical guard 151, the large-diameter nozzle FNL abuts against the second guide inclined faces 161, 163 of the guide members 153, 154, and hence does not move, which means that the abutting portion 157 does not move below the large-diameter nozzle FNL. As a result, as illustrated in FIG. 29, the large-diameter nozzle FNL, which is a fuel nozzle FN compatible with the fuel device FS, engages with a region surrounded by the guide members 153, 154 and the rotated tip of the start-up member 110, that is, the second portion illustrated in FIG. 26 and proceeds without abutting against the abutting portion 157 to abut against and push open the valve body 171 of the open/close member 170 and proceed through the fuel passage 190. After pushing open the open/close member 170 and proceeding, the large-diameter nozzle FNL, proceeds further along the fuel passage 90 to push open the second open/close mechanism 130 and reach a position where fuel can be supplied.

In the filler neck 200 described above, the discriminating portion 150 operates as follows to discriminate the external diameter of the fuel nozzle FN.

(A) In a case where the fuel nozzle FN inserted from the fuel supply port 122 is the small-diameter nozzle FNS, which is a fuel nozzle that is not compatible with the fuel device FS, the small-diameter nozzle FNS is driven into the first portion closer to the abutting portion 157 as viewed from the guide members 153, 154, and the small-diameter nozzle FNS is prevented from proceeding by the abutting portion 157. At this time, when the small-diameter nozzle FNS is inserted into the vicinity of the first portion, even if the position at which the small-diameter nozzle FNS is inserted deviates slightly relative to the first portion, the first guide inclined faces 162, 164 of the guide members 153, 154 guide the small-diameter nozzle FNS to the first portion. Providing the abutting portion 157 below the small-diameter nozzle FNS is done because the interval GD2 between the guide member 153 and the guide member 154 is larger than the external diameter of the small-diameter nozzle FNS, and hence the small-diameter nozzle FNS cannot move the conical guard 151 radially outward (in the direction of the arrow DR) with the point of contact with the start-up member 110 as a fulcrum. Because of this, the abutting portion 157 prevents the small-diameter nozzle FNS from proceeding. Further, even if the guide members 153, 154 are moved forcibly, if the tip of the small-diameter nozzle FNS passes the second guide inclined faces 161, 163 of the guide members 153, 154, the second expanded lower face 166 below the second guide inclined faces 161, 163 has a shape that recedes outward, and this shape releases engagement between the guide members 153, 154 and the small-diameter nozzle FNS such that the holding member 145 returns to the default position and the abutting portion 157 prevents the small-diameter nozzle FNS from proceeding.

(B) In a case where the fuel nozzle FN inserted from the fuel supply port 122 is the large-diameter nozzle FNL, which is a fuel nozzle compatible with the fuel device FS, because the interval GD2 between the guide member 153 and the guide member 154 is smaller than the external diameter of the large-diameter nozzle FNL, the large-diameter nozzle FNL abuts against the second guide inclined faces 161, 163 of the guide members 153, 154 without fail. As a result, even if the large-diameter nozzle FNL proceeds, movement of the conical guard 151 is not generated and the start-up member 110 is made to rotate. Thus, the large-diameter nozzle FNL proceeds to the second portion in which no abutting portion 157 is present. With this configuration, the large-diameter nozzle FNL can proceed to the fuel passage 190 past the discriminating portion 150 to open the open/close member 170.

As described above, the fuel device FS according to the second embodiment can use the interval GD2 between the guide member 153 and the guide member 154 as a gauge to accurately discriminate the external diameter of a fuel nozzle. Because of this, accounting for manufacturing tolerances, the fuel device FS can accurately discriminate between a gasoline fuel nozzle (external diameter of 20.5 mm) and a diesel fuel nozzle (external diameter of 23.5 mm) having a difference of approximately 2 mm and prevent a fuel nozzle that is not compatible with the fuel device FS from proceeding, which can reduce the occurrence of a different type of fuel from erroneously being supplied. This is similar to the first embodiment. Even with the filler neck 200 described above and when using an AdBlue nozzle (external diameter of 19.0 mm), the fuel device FS discriminates that the nozzle is not compatible and prevents the nozzle from proceeding, similar to when the small-diameter nozzle FNS is used. On the other hand, when the fuel device FS is designed for used with gasoline and the interval between the guide members 153, 154 is set slightly larger than 19.0 mm, which is the diameter of an AdBlue nozzle, and set smaller than 20.5 mm, which is the diameter of a nozzle for gasoline and the diameter of the large-diameter nozzle FNL, for example, is set to 19.75 mm, if the diameters of the first portion and the second portion are set to match this, it is easy to configure the fuel device FS in which a gasoline fuel nozzle can proceed and an AdBlue nozzle cannot proceed with a similar configuration. In this case, the fuel device FS can easily prevent a diesel fuel nozzle from proceeding if the size of the second portion is set such that a nozzle with an external diameter of 22 mm or larger cannot pass therethrough.

C. Other Embodiments

In the embodiments described above, the guide members 53, 54 and 153, 154 are provided with the first guide inclined faces 62, 64 and 162, 164 and the second guide inclined faces 61, 63 and 161, 163, but the guide members 53, 54 and 153, 154 may be provided with only one of the first guide inclined faces and the second guide inclined faces. In addition, the first guide inclined faces 62, 64 and 162, 164 or the second guide inclined faces 61, 63 and 161, 163 of the guide members 53, 54 and 153, 154 have planar inclined faces, but may have curved faces. In this case, the surfaces may be convex or concave. Further, a plurality of planes may be combined to form the second guide inclined faces. In the present embodiment, a symmetrical pair of guide members is provided at positions where the first portion and the second portion connect, but further guide member may be provided at outer edges of the second portion in addition to these guide members. Further, the second guide inclined faces of the symmetrical pair of guide members have a mirror-image relationship, but left and right guide members having different inclination directions or angles may be provided, provided that the large-diameter nozzle FNL can be guided to the second portion.

In the embodiments described above, the lower halves of the guide members 53, 54 and 153, 154 form two planar faces, for example, the second expanded lower face 66 and the first expanded lower face 67, or the second expanded lower face 166 and the first expanded lower face 167, but a configuration where these lower halves do not form the first expanded lower face 67 and the first expanded lower face 167 may also be adopted. Further, the lower halves of the guide members 53, 54 and 153, 154 may have a downward pointed cone or truncated cone shape. Alternatively, the lower halves may have a shape that recedes outward with a step. The shape is not limited to a shape that recedes due to inclination or a step, and it is sufficient that the shape be a shape forming a space in a predetermined range outward from an inner peripheral edge of the discrimination opening may be adopted and that as a result, the tip of the small-diameter nozzle FNS passing through the discrimination opening cannot make contact with the guide members 53, 54.

In the embodiments described above, the discriminating portion 50, 150 is formed of resin, but the moving member 52 and the conical guard 151 including the abutting portion 57, 157 may be formed of a material harder than resin, such as metal, because the tip of the inserted fuel nozzle directly abuts against the abutting portion 57, 157 that prevents the fuel nozzle from proceeding if the inserted fuel nozzle is a fuel nozzle not compatible with the fuel device FS. Alternatively, only the abutting portion 57, 157 may be made of metal and insert-molded into a resin moving member 52 or conical guard 151.

In the first embodiment, the moving member 52 is movably attached to the conical guard 51 by the resin spring member 41, but a leaf spring may be used. Alternatively, a spring may be provided from the rear of the moving member 52 such that the moving flange portion 55 is biased toward a direction abutting against the fixed flange portion 56. In this case, an elastic member or similar component may be used in place of a spring.

In the second embodiment, the start-up member 110 has a substantially rectangular parallelepiped shape, but the start-up member 110 may have any shape. The start-up member 110 may have a shape that becomes narrower closer to the tip to match the shape of the conical guard 151 in which the discrimination opening becomes narrower further downward. In addition, the start-up member 110 need not always rotate. For example, the start-up member 110 may be moved with respect to the conical guard 151 in the direction of the arrow DR shown in FIG. 22 when the tip of the start-up member 110 has an inclination approximately the same as the inclined portion of the conical guard 151 and the tip of the large-diameter nozzle FNL abuts against the tip of the start-up member 110. If the force F1 required to move the start-up member 110 at this time is made larger than the force F2 required to move the conical guard 151 provided with the start-up member 110 in the direction of DR, it is easy to obtain actions and effects similar to those in the second embodiment.

The conical guard 51 and the moving member 52 according to the first embodiment or the conical guard 151 according to the second embodiment have a so-called funnel shape that becomes narrower closer to the fuel passage 90, 190, but may have any shape in which the inner diameter at a second position closer to the fuel tank than a first position closer to the fuel supply port narrows, for example, a spiral shape. Alternatively, the shape may be a combination of a plurality of inclined steps.

In the above-described embodiment, the fuel device FS has a so-called capless configuration and also serves as a flap for covering the fuel supply port 22, 122 and the open/close member 70, 170 for purposes other than supplying fuel. The open/close member 70, 170 may be provided separately and independently to the flap for the capless fuel device FS. Alternatively, the open/close member 70, 170 may be provided in the second open/close mechanism 30, 130.

The present disclosure is not limited to the above-described embodiments and may be realized in the form of various configurations without departing from the gist of the present disclosure. For example, technical features in the embodiments corresponding to technical features in each aspect described in Summary may be replaced or combined as appropriate in order to solve part or all of the above-mentioned problems or achieve part or all of the above-mentioned effects. Further, any technical features not described as essential in the present specification may be omitted as appropriate.

What is claimed is:

1. A fuel device configured to accept a fuel nozzle, the fuel device comprising:
   a fuel supply port forming portion including a fuel supply port configured to accept a fuel nozzle and forming a portion of a fuel passage from the fuel supply port to a fuel tank;
   a discriminating portion provided in a region in which the fuel nozzle inserted from the fuel supply port reaches, the discriminating portion configuring a discrimination opening formed of a first portion and a second portion, the first portion being an opening corresponding to an external diameter of a small-diameter nozzle having an external diameter smaller than a fuel nozzle compatible with the fuel device, and the second portion being an opening having a shape corresponding to an external diameter of a large-diameter nozzle compatible with the fuel device;

an operation member provided in the discriminating portion and configured to guide the small-diameter nozzle intended to insert into the second portion to be inserted into the first portion;

an abutting member provided closer to the fuel tank than the discrimination opening of the discriminating portion, the abutting member preventing a tip of the small-diameter nozzle from passing the first portion; and an open/close member provided closer to the fuel tank than the discriminating portion, the open/close member being biased from the fuel tank toward a close direction and caused to enter an open state by the large-diameter nozzle passing through the second portion of the discrimination opening, wherein the discriminating portion includes an inner dimension portion of the discrimination opening at which the second portion is smaller than the external diameter of the large-diameter nozzle and a boundary between the second portion and the first portion is smaller than the external diameter of the large-diameter nozzle and larger than the external diameter of the small-diameter nozzle, the operation member includes a moving member that moves due to insertion of the large-diameter nozzle and does not move due to insertion of the small-diameter nozzle into the second portion, the movement of the moving member moves the inner dimension portion toward the first portion and extends the second portion beyond the external diameter of the large-diameter nozzle, and the moving member is an opening forming member surrounding the discrimination opening with a shape in which, between a first position close to the fuel supply port and a second position closer to the fuel tank than the first position, an inner diameter of the moving member is narrower at the second position.

2. The fuel device according to claim 1, wherein the operation member surrounds the discrimination opening with a shape in which, between the first position close to the fuel supply port and the second position closer to the fuel tank than the first position, an inner diameter of the operation member is narrower at the second position.

3. The fuel device according to claim 1, further comprising:

a guide member formed at a predetermined height close to the fuel supply port at a position at which the first portion and the second portion of the discriminating portion are connected, wherein insertion of the large-diameter nozzle abutting against the guide member causes the moving member to move.

4. A fuel device configured to accept a fuel nozzle, the fuel device comprising:

a fuel supply port forming portion including a fuel supply port configured to accept a fuel nozzle and forming a portion of a fuel passage from the fuel supply port to a fuel tank;

a discriminating portion provided in a region in which the fuel nozzle inserted from the fuel supply port reaches, the discriminating portion configuring a discrimination opening formed of a first portion and a second portion, the first portion being an opening corresponding to an external diameter of a small-diameter nozzle having an external diameter smaller than a fuel nozzle compatible with the fuel device, and the second portion being an opening having a shape corresponding to an external diameter of a large-diameter nozzle compatible with the fuel device;

an operation member provided in the discriminating portion and configured to guide the small-diameter nozzle intended to insert into the second portion to be inserted into the first portion;

an abutting member provided closer to the fuel tank than the discrimination opening of the discriminating portion, the abutting member preventing a tip of the small-diameter nozzle from passing the first portion; and an open/close member provided closer to the fuel tank than the discriminating portion, the open/close member being biased from the fuel tank toward a close direction and caused to enter an open state by the large-diameter nozzle passing through the second portion of the discrimination opening, wherein the operation member further includes a start-up member upon which a tip of the fuel nozzle inserted from the fuel supply port abuts, the start-up member is disposed at a position at which the second portion includes an inner dimension portion smaller than the external diameter of the large-diameter nozzle, and the abutting member is moved toward the start-up member when the tip of the small-diameter nozzle abuts against the start-up member and the start-up member moves when the large-diameter nozzle abuts against the start-up member, to thereby expand the inner dimension portion of the second portion further than the external diameter of the large-diameter nozzle.

5. The fuel device according to claim 4, further comprising:

a guide member formed at a predetermined height close to the fuel supply port at a position at which the first portion and the second portion of the discriminating portion are connected, wherein a portion of a tip of the large-diameter nozzle inserted from the fuel supply port abuts against the guide member to cause the start-up member to move.

6. The fuel device according to claim 5, wherein the guide member is separated from the small-diameter nozzle in a state where the small-diameter nozzle abuts against the start-up member, the operation member surrounds the discrimination opening with a shape in which, between a first position close to the fuel supply port and a second position closer to the fuel tank than the first position, an inner diameter of the operation member is narrower at the second position, and when the small-diameter nozzle is inserted abutting against the start-up member, the operation member moves the abutting member with a force smaller than a force required to move the start-up member by the small-diameter nozzle.

7. A fuel device configured to accept a fuel nozzle, the fuel device comprising:

a fuel supply port forming portion including a fuel supply port configured to accept a fuel nozzle and forming a portion of a fuel passage from the fuel supply port to a fuel tank;

a discriminating portion provided in a region in which the fuel nozzle inserted from the fuel supply port reaches, the discriminating portion configuring a discrimination opening formed of a first portion and a second portion, the first portion being an opening corresponding to an external diameter of a small-diameter nozzle having an external diameter smaller than a fuel nozzle compatible with the fuel device, and the second portion being an opening having a shape corresponding to an external diameter of a large-diameter nozzle compatible with the fuel device;

an operation member provided in the discriminating portion and configured to guide the small-diameter nozzle intended to insert into the second portion to be inserted into the first portion;

an abutting member provided closer to the fuel tank than the discrimination opening of the discriminating portion, the abutting member preventing a tip of the small-diameter nozzle from passing the first portion;

an open/close member provided closer to the fuel tank than the discriminating portion, the open/close member being biased from the fuel tank toward a close direction and caused to enter an open state by the large-diameter nozzle passing through the second portion of the discrimination opening;

a guide member formed at a predetermined height close to the fuel supply port at a position at which the first portion and the second portion of the discriminating portion are connected; and the operation member configured to prevent passage of the small-diameter nozzle through the discrimination opening by guiding the small-diameter nozzle to the first portion, the small-diameter nozzle being inserted into the discrimination opening, wherein the guide member includes a first guide inclined face inclined toward the first portion closer to the fuel supply port.

8. The fuel device according to claim 7, wherein the operation member surrounds the discrimination opening with a shape in which, between a first position close to the fuel supply port and a second position closer to the fuel tank than the first position, an inner diameter of the operation member is narrower at the second position.

9. The fuel device according to claim 7, wherein, in the second portion, the discriminating portion includes an inner dimension portion of the discrimination opening smaller than the external diameter of the small-diameter nozzle, the operation member includes a moving member that moves due to insertion of the large-diameter nozzle and does not move due to insertion of the small-diameter nozzle into the second portion, and the movement of the moving member moves the inner dimension portion of the second portion to extend the inner dimension portion beyond the external diameter of the large-diameter nozzle.

10. The fuel device according to claim 7, wherein the operation member includes:

the abutting member configured to prevent passage of the small-diameter nozzle through the small-diameter nozzle abutting at a position corresponding to the first portion of the discrimination opening, and a start-up member upon which a tip of the fuel nozzle inserted from the fuel supply port abuts, the start-up member is disposed at a position at which the second portion includes an inner dimension portion of the discrimination opening smaller than the external diameter of the large-diameter nozzle, the abutting member is moved toward the start-up member when the tip of the small-diameter nozzle abuts against the start-up member and the start-up member moves when the large-diameter nozzle abuts against the start-up member, to thereby expand the inner dimension portion of the second portion further than the external diameter of the large-diameter nozzle.

11. A fuel device configured to accept a fuel nozzle, the fuel device comprising:

a fuel supply port forming portion including a fuel supply port configured to accept a fuel nozzle and forming a portion of a fuel passage from the fuel supply port to a fuel tank;

a discriminating portion provided in a region in which the fuel nozzle inserted from the fuel supply port reaches, the discriminating portion configuring a discrimination opening formed of a first portion and a second portion, the first portion being an opening corresponding to an external diameter of a small-diameter nozzle having an external diameter smaller than a fuel nozzle compatible with the fuel device, and the second portion being an opening having a shape corresponding to an external diameter of a large-diameter nozzle compatible with the fuel device;

an operation member provided in the discriminating portion and configured to guide the small-diameter nozzle intended to insert into the second portion to be inserted into the first portion;

an abutting member provided closer to the fuel tank than the discrimination opening of the discriminating portion, the abutting member preventing a tip of the small-diameter nozzle from passing the first portion;

an open/close member provided closer to the fuel tank than the discriminating portion, the open/close member being biased from the fuel tank toward a close direction and caused to enter an open state by the large-diameter nozzle passing through the second portion of the discrimination opening;

a guide member formed at a predetermined height close to the fuel supply port at a position at which the first portion and the second portion of the discriminating portion are connected; and the operation member configured to prevent passage of the small-diameter nozzle through the discrimination opening by guiding the small-diameter nozzle to the first portion, the small-diameter nozzle being inserted into the discrimination opening, wherein a side of the guide member close to the fuel supply port includes a second guide inclined face inclined toward the second portion while reducing in diameter, and a side of the guide member opposite to the fuel supply port is formed into a shape forming a space in a predetermined region from an inner peripheral edge of the discrimination opening outward.

12. The fuel device according to claim 11, wherein the shape of the side of the guide member opposite to the fuel supply port has a shape in which the predetermined region ranging from an end point of the second guide inclined face to a side opposite to the fuel supply port recedes outward from the inner peripheral edge of the discrimination opening.

13. The fuel device according to claim 11,
wherein discriminating portion includes, in the second portion, an inner diameter portion of the discrimination opening smaller than the external diameter of the small-diameter nozzle,
the operation member includes a moving member that moves due to insertion of the large-diameter nozzle and does not move due to insertion of the small-diameter nozzle into the second portion, and
the movement of the moving member moves the inner dimension portion of the second portion to extend the inner dimension portion beyond the external diameter of the large-diameter nozzle.

14. The fuel device according to claim 13, wherein insertion of the large-diameter nozzle abutting against the second guide inclined face of the guide member causes the moving member to move.

15. The fuel device according to claim 11,
wherein the operation member includes:
the abutting member configured to prevent passage of the small-diameter nozzle through the small-diameter nozzle abutting at a position corresponding to the first portion of the discrimination opening, and
a start-up member upon which a tip of the fuel nozzle inserted from the fuel supply port abuts,
the start-up member is disposed at a position at which the second portion includes an inner dimension portion of the discrimination opening smaller than the external diameter of the large-diameter nozzle,
the abutting member is moved toward the start-up member when the tip of the small-diameter nozzle abuts against the start-up member and the start-up member moves when the large-diameter nozzle abuts against the start-up member, to thereby expand the inner dimension portion of the second portion further than the external diameter of the large-diameter nozzle.

16. The fuel device according to claim 15, wherein a portion of a tip of the large-diameter nozzle inserted from the fuel supply port abuts against the second guide inclined face of the guide member to cause the start-up member to move.

17. The fuel device according to claim 16,
wherein the guide member is disposed at a position separated from the small-diameter nozzle in a state where the small-diameter nozzle abuts against the start-up member,
the operation member surrounds the discrimination opening with a shape in which, between a first position close to the fuel supply port and a second position closer to the fuel tank than the first position, an inner diameter of the operation member is narrower at the second position, and
the operation member moves the abutting member with a force smaller than a force required to move the start-up member by the small-diameter nozzle abutting against the start-up member.

* * * * *